United States Patent
van der Wal et al.

[19]

[11] Patent Number: 5,963,675
[45] Date of Patent: Oct. 5, 1999

[54] PIPELINED PYRAMID PROCESSOR FOR IMAGE PROCESSING SYSTEMS

[75] Inventors: Gooitzen Sieman van der Wal, Hopewell; Michael Wade Hansen, Lawrenceville, both of N.J.

[73] Assignee: Sarnoff Corporation, Princeton, N.J.

[21] Appl. No.: 08/838,096

[22] Filed: Apr. 15, 1997

Related U.S. Application Data

[60] Provisional application No. 60/015,276, Apr. 17, 1996.

[51] Int. Cl.[6] .................................................. G06K 9/40
[52] U.S. Cl. .................... 382/260; 382/261; 364/724.05
[58] Field of Search ................................. 382/260, 261, 382/262, 263, 264, 265, 284, 293; 348/399, 400, 620

[56] References Cited

U.S. PATENT DOCUMENTS

| | | | |
|---|---|---|---|
| 4,692,806 | 9/1987 | Anderson et al. | 348/399 |
| 5,103,306 | 4/1992 | Weiman et al. | 348/400 |
| 5,134,480 | 7/1992 | Wang et al. | 348/620 |
| 5,208,872 | 5/1993 | Fisher | 382/300 |
| 5,325,449 | 6/1994 | Burt et al. | 382/240 |
| 5,359,674 | 10/1994 | van der Wal | 382/261 |
| 5,550,937 | 8/1996 | Bell et al. | 382/293 |
| 5,561,617 | 10/1996 | van der Wal | 364/724.05 |
| 5,657,402 | 8/1997 | Bender et al. | 382/284 |

OTHER PUBLICATIONS

Copy of International Search Report dated Aug. 4, 1997, from corresponding international application PCT/US96/05426.
(1) SMI ASSP IP90C61, Enhanced Frame Memory Controller (EFMC, Description Form, Sumitomo Industries, Ltd., (Available 4th Qtr 1995). (1 pp).
(2) SMI ASSP IP90C20, Median/Max/Min Filter (RKFil), Description Form, Sumitomo Metals, (2pp).

*Primary Examiner*—Amelia Au
*Assistant Examiner*—Samir Ahmed
*Attorney, Agent, or Firm*—William J. Burke

[57] ABSTRACT

A pipelined parallel processor (PPP) integrated onto a single integrated circuit. The PPP includes a filtering unit, internal routing circuitry such as a crosspoint switch, an internal frame store controller, and one or more function circuits. The function circuits may be, for example, arithmetic units, lookup tables, timing compensators, adders/subtractors, statistics modules, image shifting circuitry, and other useful processing devices. The components of the PPP are interconnected with the crosspoint switch which routes data between the frame store controller, the filtering unit, function circuits, external input channels, and external output channels.

9 Claims, 12 Drawing Sheets

F(t)   F(t+1)   F(t+2)   F(t+3)

FRAMES SUPER IMPOSED

FRAMES STABILIZED RELATIVE TO FRAME F(t)
AND SUPERIMPOSED

FRAMES STABILIZED RELATIVE TO FRAME t
PLUS A PANNING MOTION
AND SUPERIMPOSED

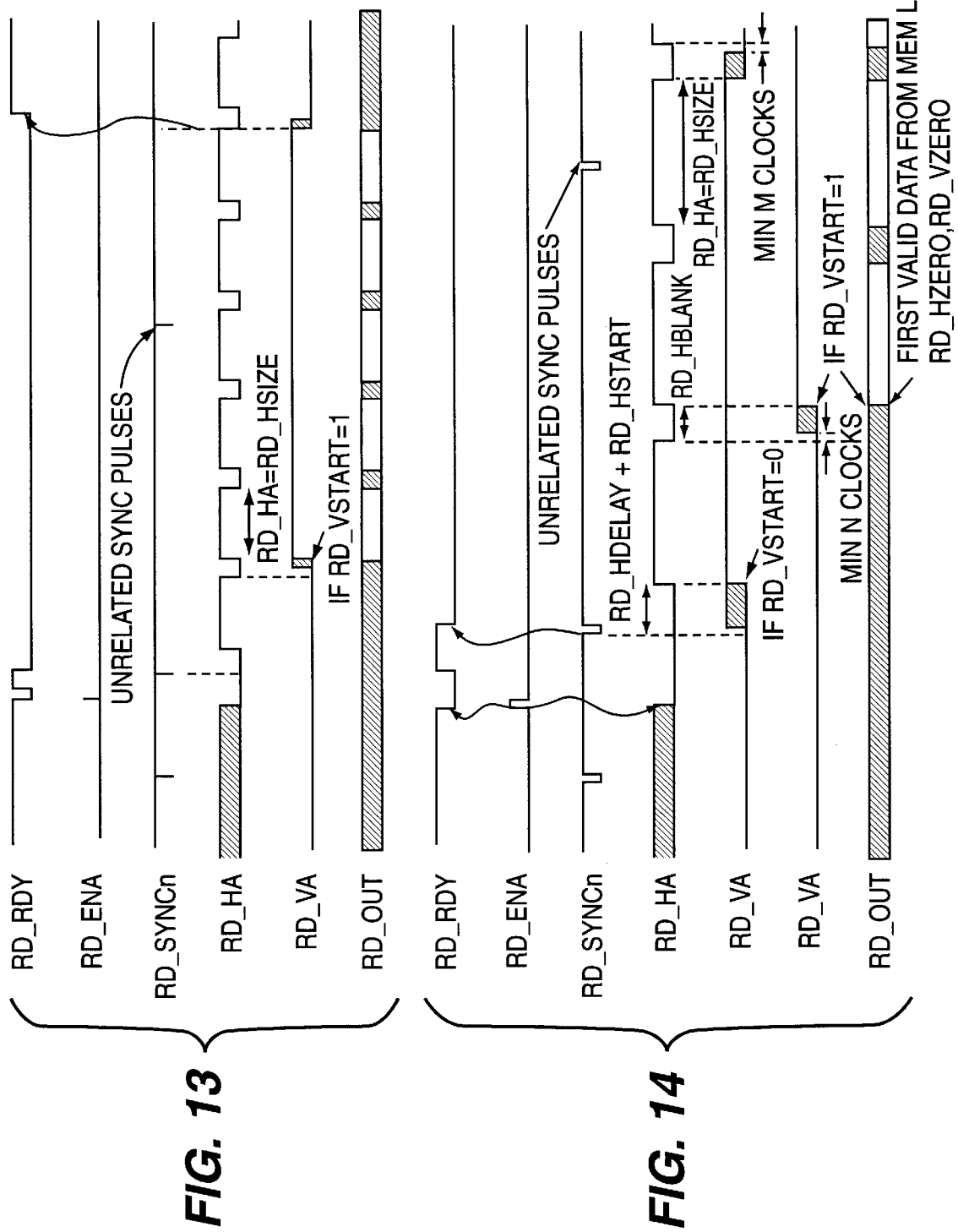

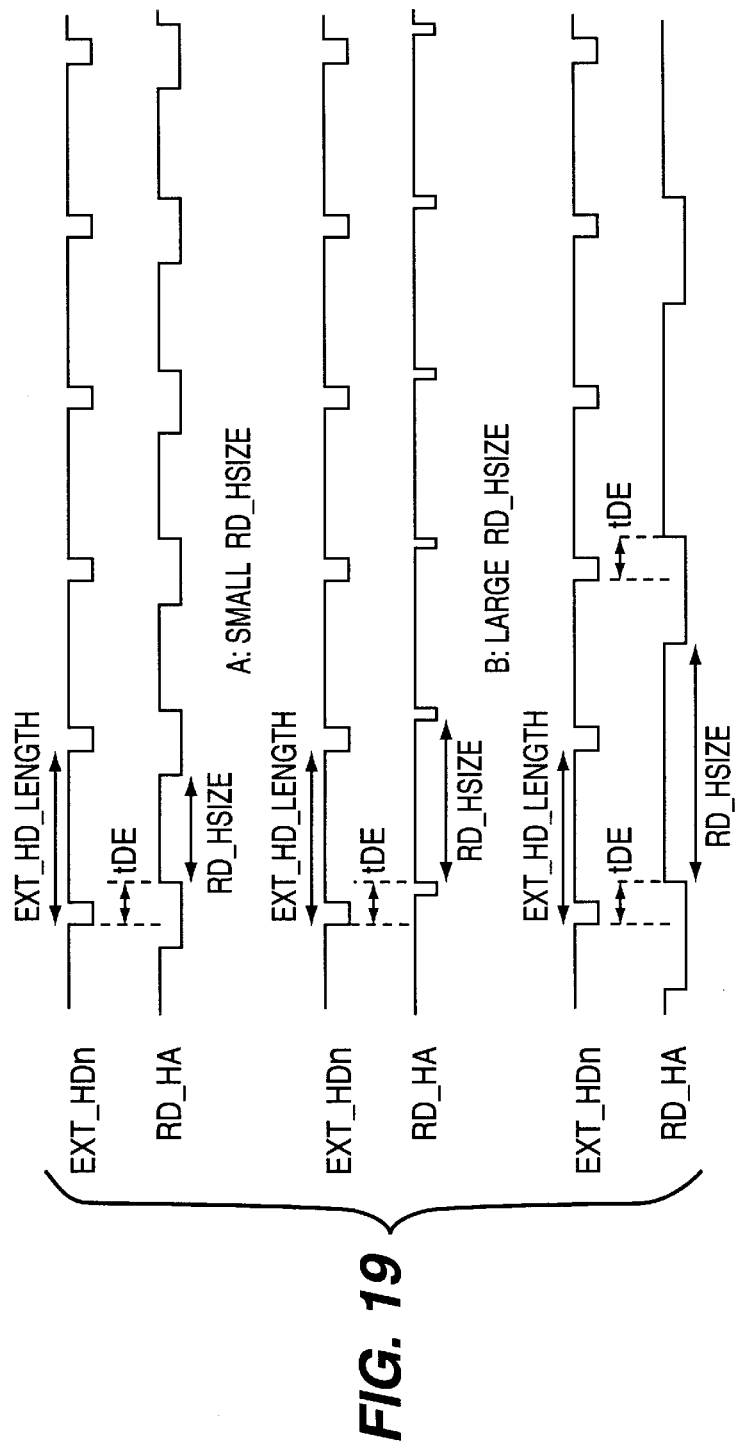
FIG. 19
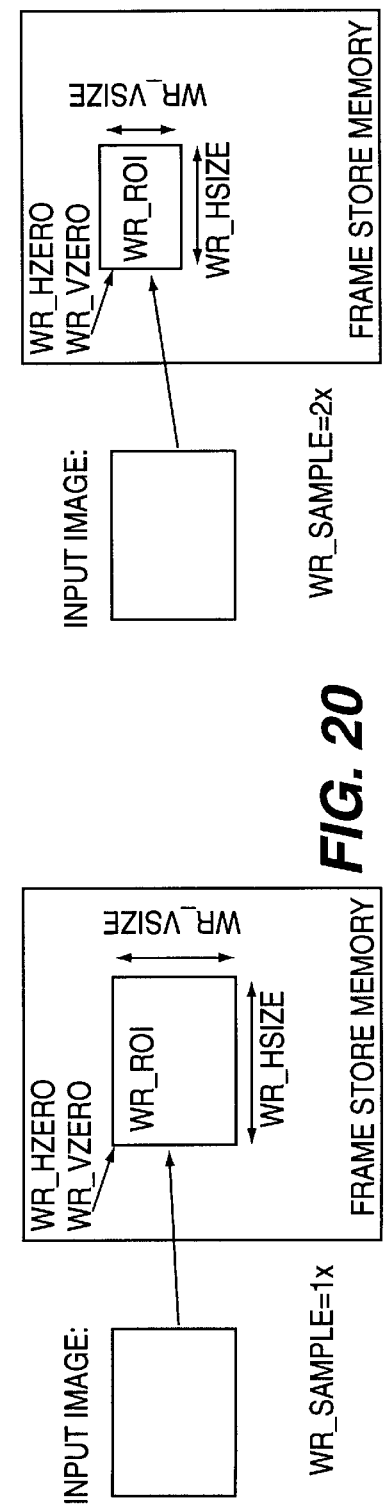
FIG. 20
FIG. 21

PIPELINED PYRAMID PROCESSOR FOR IMAGE PROCESSING SYSTEMS

This non-provisional U.S. national application, filed under 35 U.S.C. §111(a) claims, under 35 U.S.C. §119(e)(1), the benefit of the filing date of provisional U.S. application Ser. No. 60/015,276, filed under 35 U.S.C. §111(b) on Apr. 17, 1996.

FIELD OF THE INVENTION

This invention relates to a method and apparatus of digitally processing image data and, particularly, a method and apparatus for performing image processing using pipelined image processing operations combined together on a single integrated circuit.

BACKGROUND OF THE INVENTION

Pipelined image processing operations involve the connection of discrete storage and discrete pipelined image processing components which perform image operations. These image processing operations include, for example, image convolution, image warping, nonlinear image processing operations, and other specialized processes such as connected component analysis of binary images. These systems do not integrate the processing and storage circuitry into single devices. Typically, these components are connected together with external crosspoint switches or dedicated data flow routing. The use of discrete image storage and processing components results in large circuits that are difficult to fit on small printed circuit boards. In addition, the use of discrete components and longer circuit paths reduces the execution speeds of the processes.

Even discrete processing components, such as pipelined image convolution units, require additional external circuitry during implementation. For example, an image convolver chip typically has external routing to and from the chip and external image line delay elements and pixel delay elements. The line and pixel delay elements delay image data so that simultaneous operations can be performed on a pixel neighborhood. The routing and line delay circuitry increases the amount of circuit board area and reduces execution speeds.

Dedicated pipelined image processing components can provide very high performance for image processing operations at a reduced cost to performance ratio over general-purpose processors such as von Neumann and Harvard architectures. General-purpose processors typically cannot provide fundamental image operations with the same performance as pipelined architectures because general-purpose processors are limited to a data read-process-store operation for each pixel operation. Although performance of the general-purpose processors has improved with technological advances in caching and other memory management concepts, these processors are typically not suited for image operations due to the large amount of data that is processed.

Massively parallel processors and computers can provide very fast performance in comparison to general purpose processors that use von Neumann architectures, and can match the processing speeds of pipelined hardware in some instances. These devices, however, are typically very complex to program and expensive to implement. In addition, the process of providing image data to each of the processors in a timely manner before parallel execution begins is generally slow. The parallel processors first load all of the information into the processors, then execute the image processing operations, and then read the processed data out of the processors to external devices that will perform further operations on the image data. Although the parallel processors will execute the process step at rates that are typically much faster than their von Neumann counterparts, the parallel processors are typically limited by the read-process-store cycle.

Further, certain image processing operations are difficult to implement with parallel architectures. While image convolution and other filtering operations that use relatively small pixel neighborhoods can be implemented efficiently in parallel systems, operations such as image warping are still quite inefficient.

Image processing applications are typically separated into two components: fundamental, i.e.—front-end, image processing operations, such as filtering, feature extraction, image alignment, and arithmetic operations, and higher-level processes that operate on the processed image data from the front-end processing to fulfill the requirements of a particular application. In efficient implementations, the front-end processing is typically performed with dedicated hardware which can provide processing at a very high performance to cost ratio. The higher-level processing of the image data is typically performed with general-purpose processors because of their flexibility. Front-end processes typically incorporate the combination of many discrete steps, however, which makes the implementation of these processes in dedicated hardware slow and complicated.

SUMMARY OF THE INVENTION

The present invention is related to a pipelined parallel processor (PPP) integrated onto a single integrated circuit. The PPP includes a filtering unit, internal routing circuitry such as a crosspoint switch, an internal frame store controller, and one or more function circuits. The function circuits may be, for example, arithmetic units, lookup tables, timing compensators, adders/subtractors, statistics modules, image shifting circuitry, and other useful processing devices. The components of the PPP are interconnected with the crosspoint switch which routes data between the frame store controller, the filtering unit, function circuits, external input channels, and external output channels.

BRIEF DESCRIPTION OF THE DRAWING

The invention is best understood from the following detailed description when read in connection with the accompanying drawing, in which:

FIGS. 13–19 are timing diagrams useful for explaining the read operation of frame store controller 605 and 610 shown in FIG. 6.

FIGS. 20 and 21 are data structure diagrams illustrating the region of interest WR_ROI in memories 550a and 550b shown in FIG. 6.

DETAILED DESCRIPTION OF THE INVENTION

Overview

Figure 1:
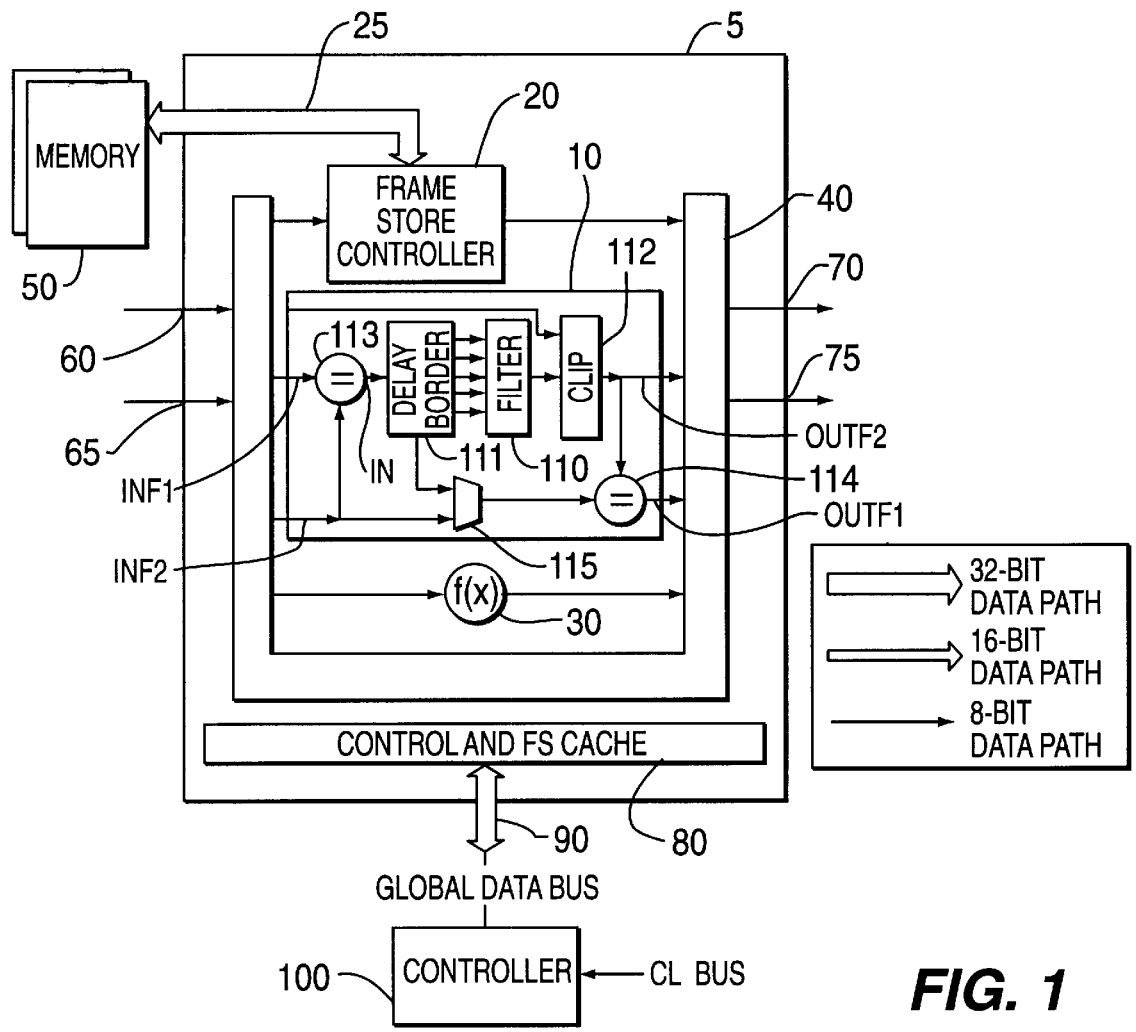
FIG. 1 is a block diagram of an exemplary embodiment of the present invention directed to a pipelined parallel processor integrated on to a single integrated circuit.

The exemplary embodiment of the invention is directed to a Pipelined Pyramid Processor (PPP) which integrates the most fundamental storage and processing aspects of the front-end image processing operations into a single ASIC device. The fundamental storage and processing aspects are implemented by a PPP having a filtering unit, internal routing circuitry, an internal frame store controller, and one or more function circuits. Additional circuitry may be added to the PPP to implement particular processing operations including arithmetic logic unit and digital signal processing core operations. In addition, the components of the PPP may be programmed to perform a variety of processing operations. In either case, the PPP provides a flexible architecture that may be added to and/or programmed to perform a variety of image processing operations. The PPP also provides an architecture from which ASICs may be developed and produced. The filtering unit, internal routing circuitry, and internal frame store controller provide a standardized architecture and interface for the addition and integration of other components.

As a result, the amount of board space required to implement front-end image processing systems is greatly reduce by integrating many components into a single device. In addition, the effective execution time of the image processing operations is decreased because on-chip processing is typically performed at higher rates than processing that requires communications among multiple discrete processing devices; in addition, these pipelined operations may overlap. Finally, the processing systems can be implemented rapidly and with minimal integration because of the standardized architecture and interfaces.

Overview of First Exemplary Implementation of PPP

A first exemplary implementation of the PPP is described below with reference to FIG. 1. The PPP includes processing circuitry which is implemented on a single integrated circuit (IC) 5. The circuitry includes a filtering unit 10, internal routing circuitry such as a crosspoint switch 40, an internal frame store controller 20, and one or more function circuits 30. The function circuits 30 can be arithmetic units, lookup tables, timing compensators, adders/subtractors, statistics modules, image shifting circuitry, and other useful processing devices. The devices are interconnected with the crosspoint switch 40 which routes image information between the frame store controller 20, filtering unit 10, function circuits 30, external input terminals 60 and 65, and external output terminals 70 and 75. The circuitry is configured to accept input signals having imbedded timing signals. These timing signals are propagated through the circuitry with compensating delays to match the delays of the data signals. These propagated timing signals are imbedded in the output signals.

The crosspoint switch 40 is a centralized non-blocking crosspoint switch. Crosspoint switch 40 encodes channels of image data along with timing information to enable multiple channels of image information to be processed without interference. Crosspoint switch 40 is used to route image data between frame store controller 20, filtering unit 10, function circuits 30, input channels 60 and 65 and output channels 70 and 75.

The input data signals and the output data signals of frame store controller 20 are connected directly to crosspoint switch 40 which routes the image data between frame store controller 20 and the other circuitry connected to crosspoint switch 40. The frame store controller resamples image data signals during image read and store operations and executes read and store operations simultaneously. The frame store controller 20 may also include an access port (not shown) to allow the frame store controller 20 to be accessed through a global data bus 90 for processor read and store operations without passing through crosspoint switch 40.

Filter unit 10 may be a two-dimensional filter having a separable kernel which can be treated as a combination of separate horizontal and vertical filters. The five vertical and five horizontal filter coefficients of the exemplary filter unit 10 are programmable within a limited set of values and may be either symmetric or antisymmetric. In addition, the filter unit 10 may be configured to have either an odd or an even number of taps. The filter unit 10 combined with the frame store controller 20 can be used for many types of image filtering applications. These include the efficient generation of multiresolution representations of imagery (i.e. image pyramids) as described in U.S. Pat. No. 5,359,674, entitled PYRAMID PROCESSOR INTEGRATED CIRCUIT, issued to van der Wal, which is incorporation herein by reference. Multiresolution (pyramid) representations in image processing are used for efficient image processing operations including, for example, image feature analysis, image compression, image registration (alignment), and motion estimation. These applications use the resampling operation of frame store controller 20, described below, for image decimation and expansion operations that are a part of pyramid generation and reconstruction.

Function circuits 30 may implement a variety of different image processing functions. These functions include (1) fundamental arithmetic operations at differing levels of precision, (2) arbitrary pointwise single image operations, (3) arbitrary pointwise dual image operations, (4) image statistical analysis, and (5) nonlinear image filtering. These functions are described below.

Fundamental arithmetic operations are used in many image operations. These include the detection of image intensity changes and image motion estimation, which use image addition, subtraction, multiplication, and division.

Arbitrary pointwise single image operations are used to process image data. Both linear and nonlinear functions of pixel values may be used during image processing to provide useful processing results. These operations include adding gain to images, implementing image thresholding operations, and inverting images. A programmable look-up table is typically used to implement these operations in a flexible manner.

Many operations in front-end processing use arbitrary pointwise operations on two images. The arbitrary pointwise operations include image masking, image modulo arithmetic, i.e. one image modulo with another image, and other image operations where the resulting image is the same precision as either of the input images. Operations such as image multiplication, sum-squared, and sum-absolute difference, may also be implemented using arbitrary pointwise operations if the output is scaled to retain the same precision as the inputs. Usually, a programmable look-up table is used to implement these operations if a large amount of memory is available internal or external to the chip (e.g. 64 k×8). Alternatively, many of the functions can be implemented directly in the PPP.

Image statistical analysis such as the generation of image histograms and accumulation over the entire image or sub-region of the image are used to accurately determine appropriate thresholds, to determine the amount of image energy in a given scene, and to interpret cross-correlation surfaces and other objective functions for motion estimation and image alignment.

Nonlinear image filtering is used to perform spatial operations such as minimum, maximum, and median filtering which are very important for cleaning up and conditioning processed image data for further processing. These operations are typically very expensive to implement using general-purpose processors, but are readily available using the PPP. One such device whose functional circuits may be incorporated into the PPP is Median/Max/Min Filter part no. IP90c20 manufactured by Sumitomo Metals.

The PPP incorporates a subset of these operations into a single integrated circuit with an internal crosspoint switch 40 for flexible on-chip routing of the video information through the various processing devices. This provides very efficient implementations of many front-end processes, while integrating the components so they can be efficiently incorporated into final processing architectures and devices with a minimal amount of circuit board space and cost. The performance of the PPP in implementing any of these functions will typically be an order of magnitude or more better than the same processing being performed with general-purpose processors, and typically be a fraction of the cost of massively parallel processing systems.

The function circuitry 30 may be, for example, a look-up table (LUT) having a programmable registered memory capable of performing arbitrary pointwise operations on a single image. The LUT can be used for increasing gain of image data, applying nonlinearities to the image data, inverting the image data, and other single image operations. The functions of the LUT is programmed through global bus 90. Different functions of the LUT may be stored in the PPP to reduce setup time when programming the LUT.

Using $0.5\mu$ or the current state of the art $0.35\mu$ CMOS designs, the minimal implementation PPP may be incorporated into a single ASIC. Such an ASIC would be capable of running at internal speeds of 60 Mhz or higher. Using $0.35\mu$ CMOS designs will not only reduce the die size of the PPP, but will increase the processing speeds and reduce the power dissipation of the PPP.

The operation of the different components shown in FIG. 1 will be described in greater detail using an exemplary application of the PPP to perform image stabilization. Although the exemplary embodiment of the present invention is explained below with reference to a specific image processing application, the PPP is applicable to many different image processing applications.

DETAILED DESCRIPTION OF THE EXEMPLARY APPLICATION

Overview of Image Stabilization

Video captured by a hand held camera, or by a tripod-mounted camera with a large telephoto lens often exhibits some random image motion. Reducing the image motion is very desirable for viewing such video. Image stabilization is a process which eliminates or reduces a component of the image motion in a video sequence. Accurate image stabilization can greatly enhance the ability to analyze or further process video by means of a digital processor and, therefore, considered a very important "vision-front-end" image process. Image stabilization can be applied in several modes. One mode removes all image motion, which makes it appear as if the video camera was completely stationary. Another form of stabilization smoothes the image motion, by eliminating only fast image motion, but allowing for slow image motion, such as image panning, to occur.

Figure 2A:
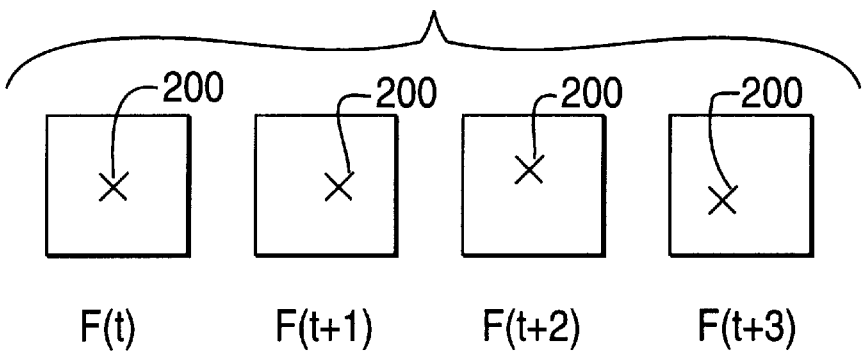
FIGS. 2(a)–2(d) are data structure diagrams of frames of an image signal illustrating the conceptual operation of an image stabilization process.

Image stabilization can be achieved by determining the image motion between consecutive image frames, and then compensating for this image motion by warping, i.e.— aligning, the current frame towards a previous frame so that its image aligns with the image of that previous frame. An example of several consecutive frames of an video image signal is shown in FIG. 2(a) where t indicates an instant in time. The video image signal includes a sequence of four video frames F(t), F(t+1), F(t+2), and F(t+3), where there is an apparent random motion of the image 200 in the four frames.

Figure 2B:
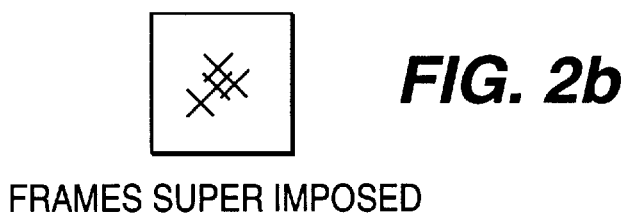
Figure 2C:
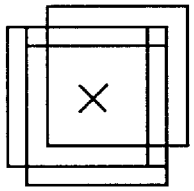
Figure 2D:
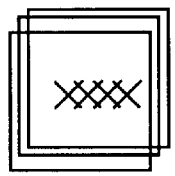

FIG. 2(b) shows the four frames F(t), F(t+1), F(t+2), and F(t+3) superimposed to illustrate the amount of image motion among the four frames. FIG. 2(c) illustrates the four frames F(t), F(t+1), F(t+2), and F(t+3) after image stabilization according to the first method. The subsequent image frames F(t+1), F(t+2), and F(t+3) are aligned to the frame F(t). FIG. 2(d) illustrates the four frames F(t), F(t+1), F(t+2), and F(t+3) after image stabilization according to a second method where image stabilization is implemented by "smoothing" the image motion. There is a general motion of the image to the right in FIG. 2(d).

Figure 3:
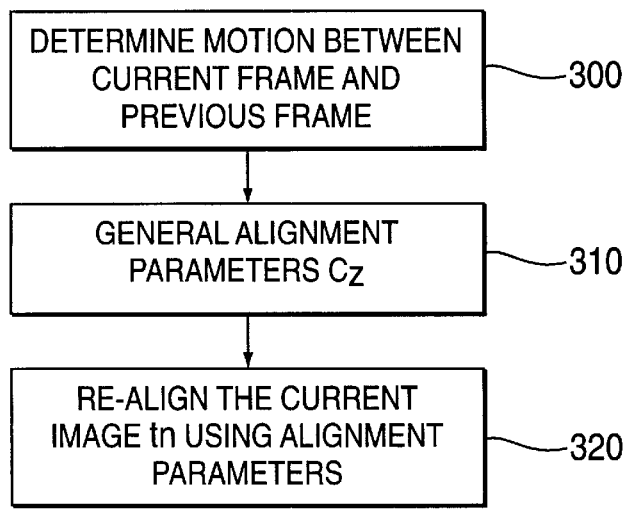
FIG. 3 is a flow chart diagram illustrating the image stabilization process of the frames shown in FIGS. 2(a)–2(d) in accordance with an exemplary embodiment of the present invention.

FIG. 3 is a flow chart illustrating the stabilization method for stabilizing a video image signal. At step 300, the method determines the image motion between the current frame F(t) and a previous frame F(t−1). Then, at step 310, the alignment parameters Cz are generated to align the current image F(t) to the reference frame, or to an image position at which unwanted image motion is removed. At step 320, the current image is re-aligned, i.e.—warped, according to the alignment parameters Cz. The stabilization method of FIG. 3 is illustrated in FIG. 4.

Figure 4:
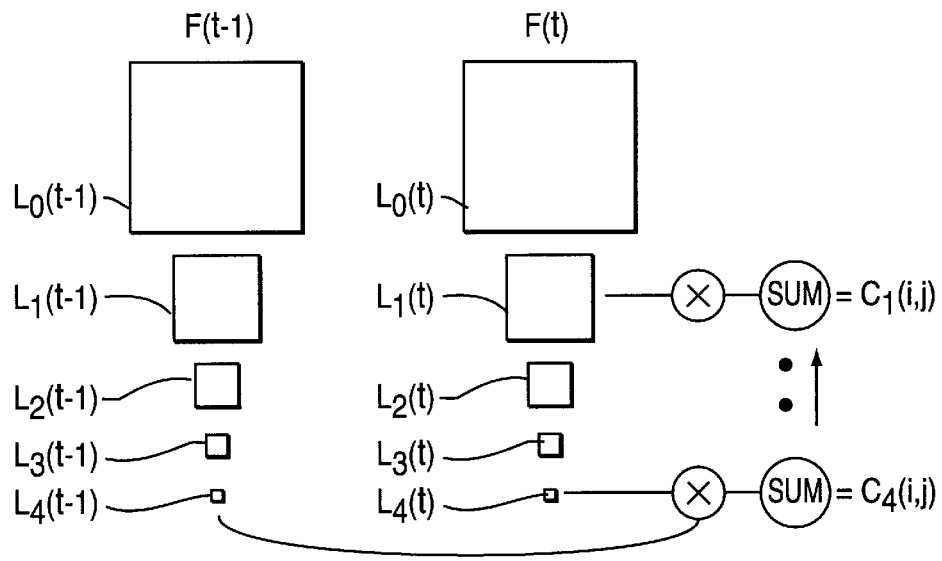
FIG. 4 is data structure diagram illustrating the conceptual operation of the image stabilization process shown in FIG. 3.

As shown in FIG. 4, a set of image correlations are performed in a hierarchical fashion to determine the amount of image motion that has occurred between the current frame F(t) and the previous frame F(t−1). To determine the amount of image motion, an image pyramid is generated from the current frame F(t). For example, the Laplacian pyramid Lz(t−1) to Lz(t−1), for example $L_0$(t−1) to $L_4$(t−1), is generated for the previous frame F(t−1) and the Laplacian pyramid Lz(t) to Lz(t), for example $L_0$(t) to $L_4$(x), is generated for the current frame F(t). The correlation between the current frame F(t) and the previous frame F(t−1) are performed using a sixty four pixel value by sixty four pixel value region of the frames.

For each level, the correlation values Cz(i,j) are generated in accordance with equation (1) below.

$$C_n(i, j) = \sum_x \sum_y L_n(x+i, y+j, t) \cdot L_n(x, y, t-1) \qquad (1)$$

where x and y are coordinates of the pixels values in the nth level of the Laplacian image pyramid and i and j are integers and $-2 \leq i \leq 2$ and $-2 \leq j \leq 2$. For example, when there are four levels of the Laplacian pyramid, z=1, 2, 3, or 4. Twenty five correlation values Cz(i,j) may be produced at pyramid level z=4 because pyramid level four includes sixteen pixel values corresponding to the pixels of the frames. In other words, a five pixel value by five pixel value region correlation at level four represents a total correlation search space of 64-by-64 pixel values in each of the current frame F(t) and the previous frame F(t−1).

A simple maximum search is performed on the twenty five correlation values Cz(i,j) to determine the location of the maximum correlation value Cz(i,j)max. Once the maximum correlation value has been determined, the correlation values Cz(i,j) adjacent to and including the maximum correlation value Cz(i,j)max are interpolated to estimate the maximum peak correlation value Cz(i,j)peak of the correlation values Cz(i,j) to sub-pixel accuracy. The peak correlation value Cz(i,j)peak provides an estimate of the image motion, relative to the image resolution of the pyramid level at which the correlation values Cz(i,j) are generated. At level z=4, the estimate is coarse but motions are stimulated over a large range.

Next, the peak correlation value Cz(i,j)peak for the next higher resolution level z=3 is produced. Prior to generating correlation values between previous Laplacian image Lz(t−1) and the current Laplacian image Lz(t), the previous Laplacian image Lz(t−1) is first warped with the course motion estimate, peak correlation value C4(i,j)peak, obtained from the correlation at level four, z=4. Thus, the correlation computation at level three, z=3, is a refinement of the previous motion estimate. At level three, the expected residual motion is less than ±1 pixel value per line. A three-by-three value region in the Laplacian image at level three, z=3, is used to generate the correlation values C3(i,j).

The image motion estimate is refined again by repeating this process at level 2. Typically, the motion estimate obtained at this resolution is better than one tenth the pixel resolution of level zero, z=0, if the image motion was a pure translation. The peak correlation values Cz(i,j)peak are added and used to warp the current frame F(T) and stabilize the image.

Detailed Description of the Image Stabilization System

Figure 5:
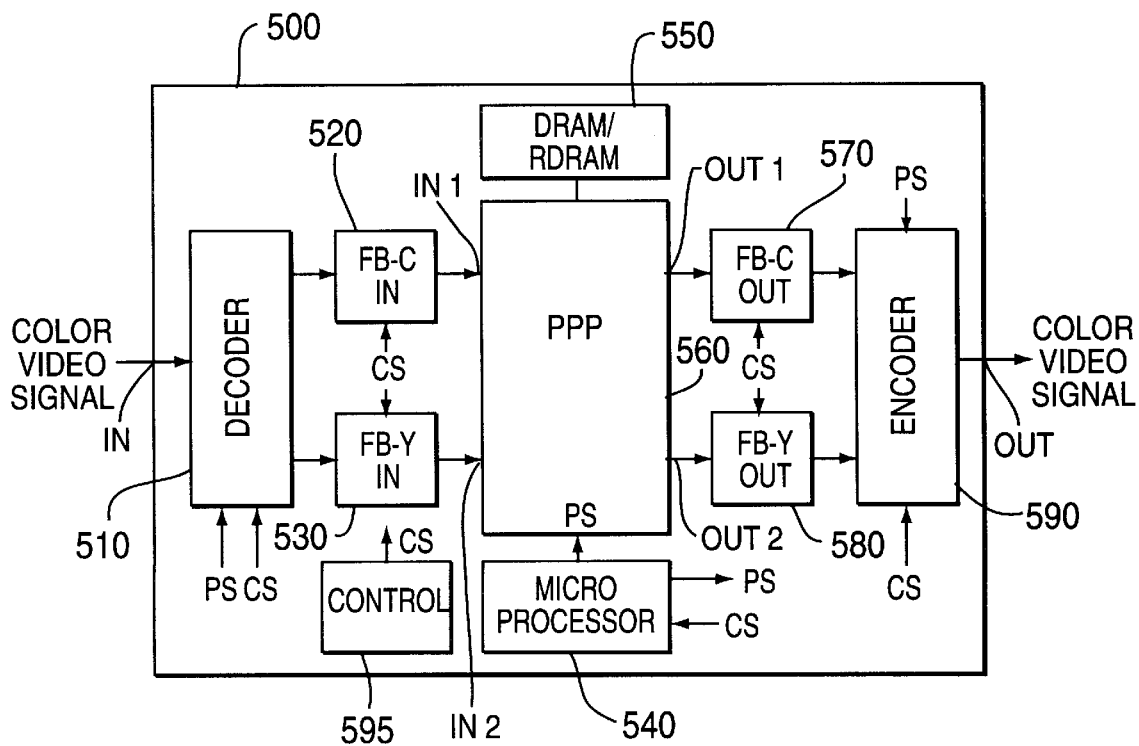
FIG. 5 is a block diagram of an exemplary embodiment of the present invention directed to pipelined parallel processor integrated onto a single integrated circuit within an image stabilization system.

The image stabilization system is described below with reference to FIGS. 5–7. FIG. 5 is a block diagram of the image stabilization system according to an exemplary embodiment of the present invention. A color video signal is provided to input terminal IN of the video stabilization system 500. The color video signal is an NTSC video signal digitized to component digital image format 4:2:2. Alternatively, the color video signal may be a standard component digital format such as CCIR601, D1 format. The D1 format has 1440 pixels per line, where the luminance component signal Y has 720 pixel values and the chrominance component signal has two chrominance component signals each including 320 pixels interleaved into a single data stream. Another possible input may be an MPEG encoded signal that is decoded into linear scan image format.

The color video signal is provided to input video decoder 510 which is, for example, a Philips Part No. SAA7110. The input video decoder 510 digitizes the color video signal and generates two digital video output signal streams: the luminance component signal Y and the chrominance component signals Cu and Cv, in 4:2:2 format. The luminance component signal Y is represented at full digitized resolution, i.e.—640 active pixel values per line, and the chrominance component signals Cv and Cu are subsampled at a factor of two in the horizontal direction, i.e.—320 active pixel values per line. The chrominance component signals Cv and Cu are interleaved to form 640 pixel values per line. Alternatively, the video decoder could be integrated in the PPP 560.

Table 1 below illustrates the two data streams, where Cu and Cv are the two color components, Y is the luminance component, and the index is the pixel value number on the image line.

TABLE 1

| | |
|---|---|
| Luminance Signal | Y0 Y1 Y2 Y3 Y4 Y5 Y6 Y7 Y8 . . . |
| Chrominance Signal | Cu0 Cv0 Cu2 Cv2 Cu4 Cv4 . . . |

The luminance component signal Y is provided to frame buffer 530 and the chrominance component signal is provided to frame buffer 520. The luminance and chrominance component signals are provided to these respective frame buffers at a clock rate at 12.5 MHz to 13.5 MHz. Each frame buffer 520 and 530 is double buffered so that luminance component signal Y and the interleaved chrominance component signals Cu and Cv may be stored in one buffer at a clock rate of 13.5 MHz and read from the other buffer at a clock rate of 60 MHz. An example of frame buffers 520 and 530 is Hitachi part no. HM530281, which can store 332 k pixel values of data.

The luminance component signal Y and the chrominance component signals Cu and Cv are provided to Pipelined Parallel Processor (PPP) 560 which is a single integrated circuit. PPP 560 implements the stabilization process described above. PPP 560 is described below with reference to FIG. 6. PPP 560 includes crosspoint switch circuitry 640, filter units 615 and 620, two delays 625a and 625b coupled respectively to multipliers 630a and 630b which are in turn respectively coupled to accumulators 635a and 635b, two frame store controllers 605 and 610 which are respectively coupled to memories 550a and 550b which form memory 550, shown in FIG. 5, and look-up table (LUT) 645.

The crosspoint switch 640 may be the same as crosspoint switch 40, shown in FIG. 1. Crosspoint switch 640 is provided the luminance component signal Y via terminal IN1 and the chrominance component signals via terminal IN2. The luminance and chrominance component signals are multibit digital signals containing at least eight data bits and two timing bits. The two timing bits convey respective timing signals. One signal, HA, is in a logic high state when the data in a line is valid (i.e. during the active picture interval) and in a logic low state otherwise (i.e. during the horizontal blanking interval). The other signal, VA, is in a logic high state when the data in a frame is valid and in a logic low state otherwise (i.e. during the vertical blanking interval). FIG. 7 is a timing diagram which illustrates the relative timing of the signal provided to terminal IN1 and the signal provided from output terminal OUT1, and the signals HA and VA for those signals. The exemplary operation shown in this timing diagram delays the output signal by approximately two line intervals with respect to the input signal.

The PPP 560 uses the timing signals HA and VA in the same manner as described in the above-referenced U.S. Pat. No. 5,359,674. The timing signals HA and VA remain associated with the input image signal as the input image signal is processed by the stabilization system 500. As a result, when the stabilized image signal is produced, the vertical and horizontal blanking periods of the stabilized image signal do not need to be generated. The relative timing of the stabilized image signal is maintained by associating the timing signals HA and VA with the color video signal as it is processed. Thus, less circuitry is required.

The two delays 625a and 625b may serve several functions. The delays 625a and 625b provide a programmed delay operation to delay one digital image data stream relative to another digital image data stream to compute cross correlation or other two-operand functions that require a shift location in the horizontal or vertical direction between two images. The delays 615a and 615b also provide automatic alignment in time of two image data streams. For example, the delays 615a and 615b align two image data streams in time if the two image data streams are to be combined in a two-operand function using, for example, multiplier 630a. The two image data streams may not be aligned in time because they have encountered different delays through the device. For example, the image data streams may not be aligned if one image data stream is passed through LUT 645 and the other image data stream is not. The image data timing signals HA and VA associated with each image data stream allow the delays 615a and 615b to automatically detect the time difference between the two image data streams and delay one image data stream such that the two image data streams are aligned in time when presented to the two-operand function. The programmed delay operation may be combined with the automatic alignment operation.

The exemplary embodiment is not limited to processing multibit digital signals containing eight data bits and two timing bits. The exemplary embodiment may be configured to receive multibit digital signals containing, for example, 10 data bits and two timing bits.

Figure 6:
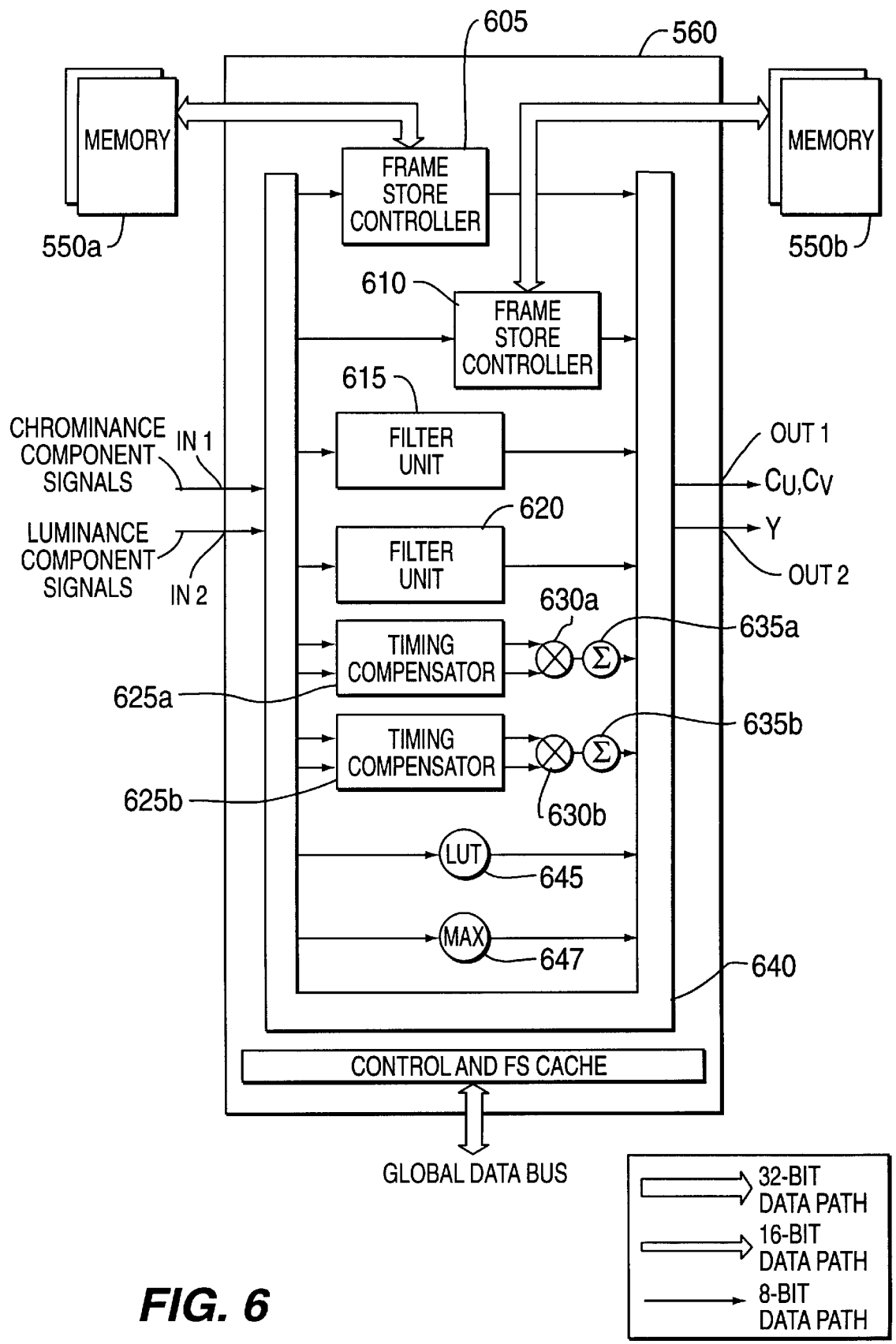
FIG. 6 is a block diagram of the PPP 560 and memory 550 shown in FIG. 5 in accordance with an exemplary embodiment of the present invention.
Figure 7:
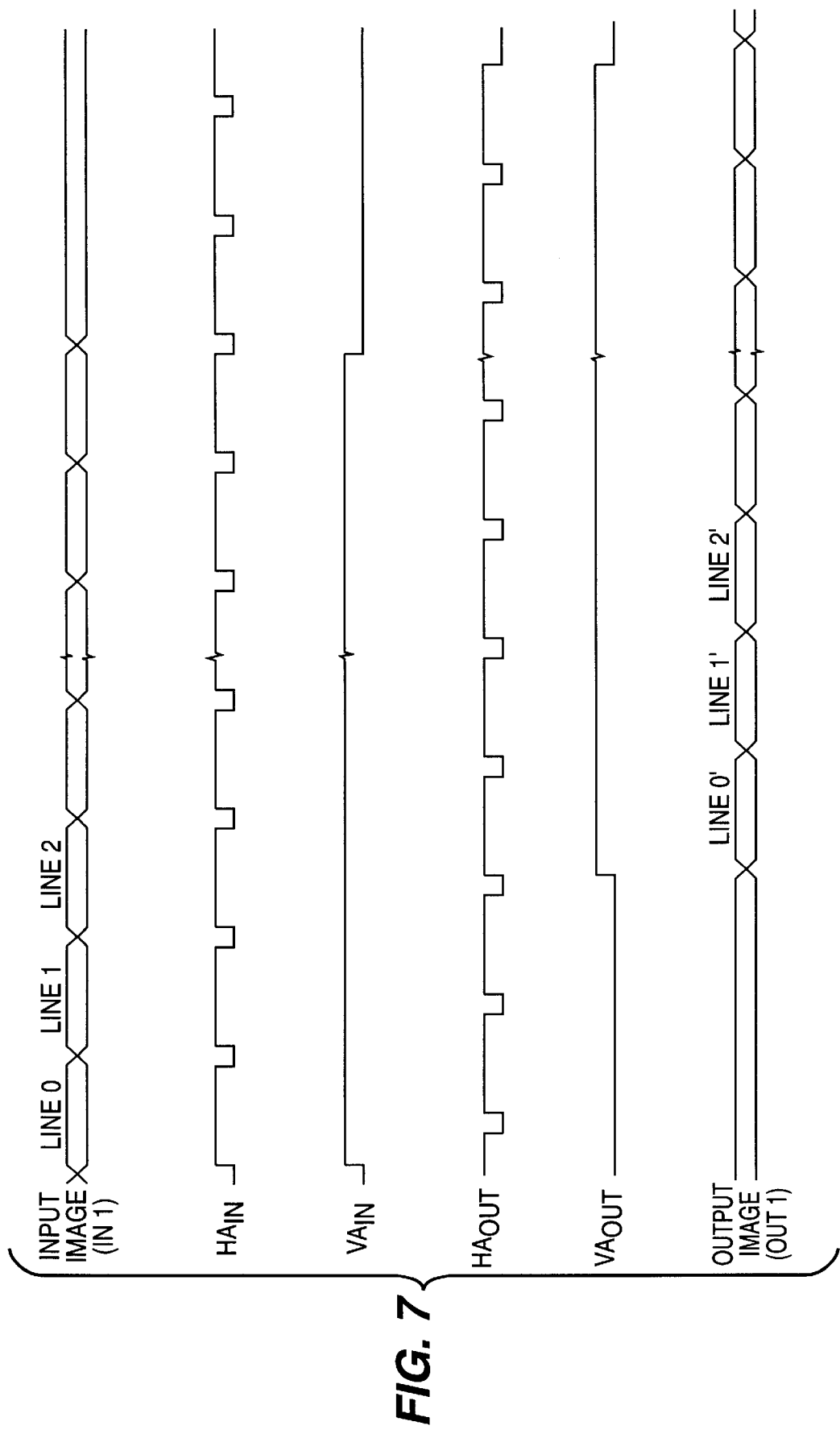
FIG. 7 is a timing diagram useful for explaining the operation of the PPP of FIG. 6.

Referring to FIG. 6, crosspoint switch 640 enables signals provided via input terminals IN1 and IN2 to be connected to any of the output terminals OUT1 and OUT2, without interfering or blocking any of the other channels within the crosspoint switch 640 for maximum parallelism and interconnectivity. The routing performed by the crosspoint switch 640 is programmable from an external controller 595, shown in FIG. 5, through global data bus 645. Exemplary circuitry which can be used for crosspoint switch 640 and external controller 595 is the LSI Logic crosspoint switch part number L64270 QC-40.

Figure 8:
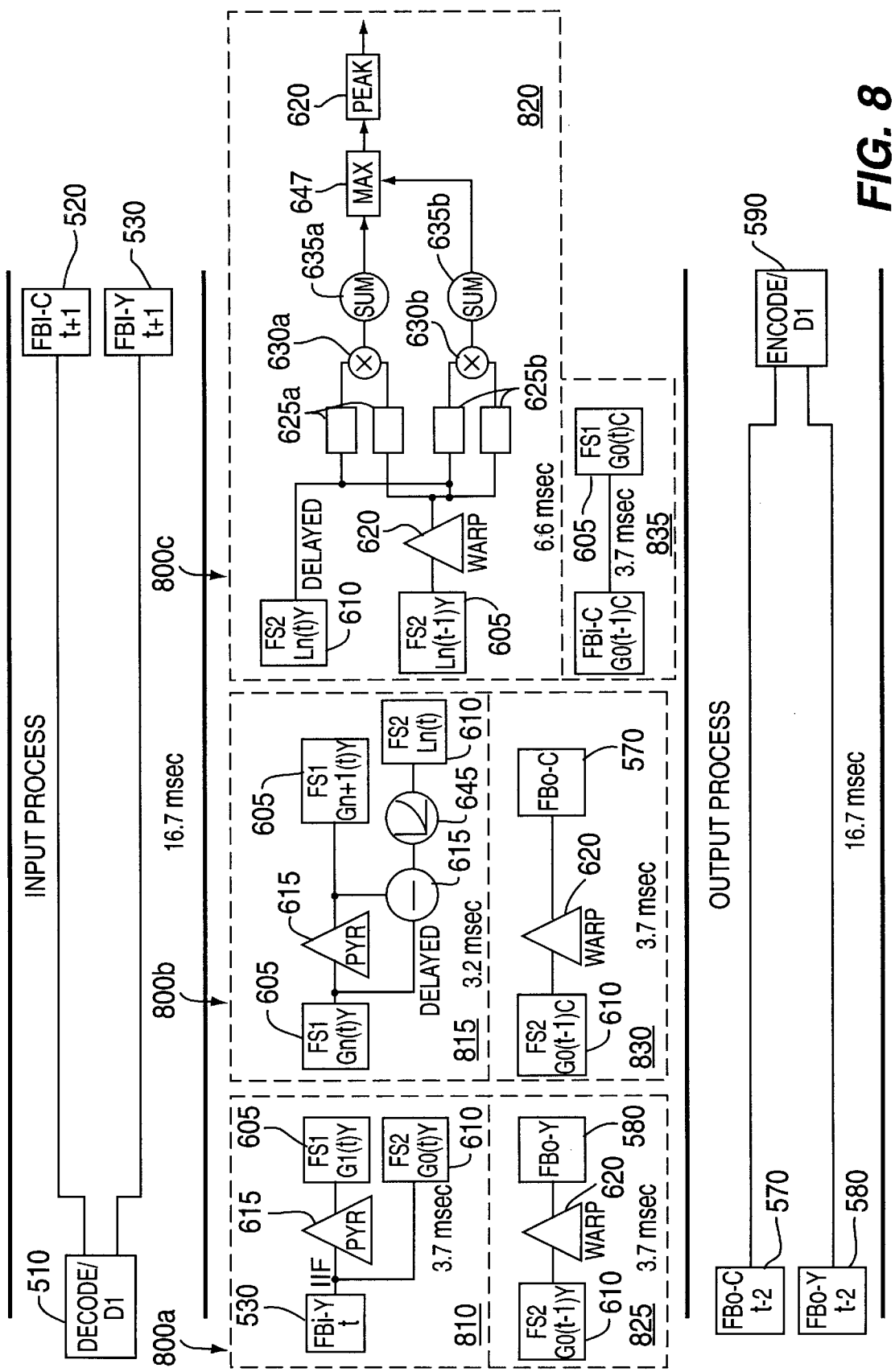
FIG. 8 is a data flow diagram illustrating the operation of the image stabilization system shown in FIG. 6 in accordance with an exemplary embodiment of the present invention.

FIG. 8 is data flow diagram suitable for illustrating the operation of the video stabilization system 500 and, particularly, the PPP 560, shown in FIG. 5. In general, as is shown in FIG. 8, a number of different processes are implemented by the PPP 560 during one cycle to stabilize the image.

In process block 810, a Gaussian image G1(t)Y is generated from a luminance component signal Y provided to the PPP 560 from frame buffer 530, shown in FIG. 5. In process block 815, the Gaussian image G1(t)Y is used to produce lower level Gaussian images Gn+1(t) and the Laplacian image pyramid, shown in FIG. 4. Each time process block 815 is repeated, one of the Laplacian images L0(t) through L4(t), shown in FIG. 4, is produced. Although process block 815 is repeated, the time required to produce the Laplacian image pyramid and the lower level Gaussian images is less than the amount of time required to produce the Gaussian image G1(t)Y in process block 810. This occurs because the number of pixel values in the Laplacian and Gaussian images are reduced by, for example, one fourth for each level of the Gaussian and Laplacian images. Thus, there are fewer pixel values to be processed by process block 815.

In process block 820, after the Laplacian pyramid has been produced, the Laplacian images L0(t) through L4(t) and the Laplacian images L0(t−1) through L4(t−1) produced during a previous cycle, are used to generate the alignment parameters C(x,y) as described above with reference to FIG. 4. In process block 825 during the next cycle, the alignment parameters C(x,y) are used to warp the luminance component signal Y of the input image frame (IIF) from the previous cycle. In process block 830, the alignment parameters C(x,y) are used to warp the chrominance component signals Cu and Cv of the IIF from the previous cycle. In process block 835, the chrominance component signal of the next frame is provided to the PPP 560, shown in FIG. 5, frame buffer 520. Process blocks 810 through 835 align the frames of an input image signal. The stabilization process is described in greater detail below.

The stabilization process performed by PPP is divided into three steps, where each step consists of two or more parallel processes. The steps are: (1) generate first Gaussian level, section 800a, (2) generate Laplacian pyramid, section 800b, and (3) perform hierarchical image correlations, section 800c. The total time required for the PPP 560 to complete all three steps is about 14 msec assuming a 50 Mhz clock. The stabilization process is performed by the PPP 560, and consists of a set of operations performed in parallel and in series, all within one field time. If the video format is a 30 Hz video format (e.g. NTSC), the field time is about 16.7 msec.

As is shown in FIGS. 6 and 8, the luminance component signal Y is provided from buffer 530, shown in FIG. 5, to crosspoint switch 640, shown in FIG. 6, which routes the luminance component signal Y to frame store controller 610 and filter unit 615. Filter unit 615 is a pyramid filter unit and is the same as the filter unit 10, shown in FIG. 1. As is shown in FIG. 1, line delay and border control (hereinafter delay/border control) circuitry 111 provides a four or eight-line delay for the vertical portion of the two-dimensional filter. The delayed lines are processed both vertically and horizontally in delay/border control circuitry 111. Filter circuitry 110 and line delays and border control circuitry 111 are, for example, the filter 110, memory 114, address counter 116, and timing circuitry 128, described in the above referenced patent issued to van der Wal.

The delay/border control circuitry 111 ensures that border effects are minimized in the filter unit 615 by edge extending, mirroring, or blanking out the pixel values outside of the region of the image before filtering. The delay/border control circuitry 111 can also be used to provide spread-tap (resampled) filtering, and can be used to zero out intermediate pixels in the image for accurate image interpolation operations.

The output signal provided by filter circuitry 110 is processed by clip processing circuitry 112 which performs rounding and scaling for single precision signals and combines the filtered data as the more significant bit (MSB) positions with filtered data representing the less significant bit (LSB) positions to generate double-precision output signals. Clip processing circuitry 112 corresponds to, for example, clip processing circuitry 124 described in the above-referenced U.S. Pat. No. 5,359,674.

The signal provided by multiplexer circuitry 115 may be either the input signal INF2 or one of the delayed horizontal line signals provided by the delay/border control 111. Multiplexer circuitry 115 is coupled to internal compensating delays (not shown) in the delay/border control 111. The internal compensating delays are used to delay the input signal INF1 from one to eight lines intervals. Multiplexing circuitry 115 selects among the input signal INF1 delayed by one to eight line intervals or input signal INF2.

The output signal of multiplexer 115 and clip processing circuitry 112 can be processed by ALU 114 to produce output signal OUTF1. ALU 114 operates the same as ALU 113 of the above referenced patent issued to van der Wal. ALU 114 is used to perform operations between the filtered image and the nonfiltered image, or can pass one of the images without modification. Filter unit 615 has two parallel paths which may be used to simultaneously calculate a Gaussian low-pass filtered image and a Laplacian function (the difference of the input image and the Gaussian) of the input image. As is shown in FIG. 1, the Laplacian image may be generated by the ALU 114 which receives the Gaussian image from clip circuitry 112 and a delayed input image from delay/border control 111 and multiplexer 115. The Gaussian and Laplacian images are used during image stabilization as described below. The generation of Gaussian and Laplacian images using filter unit 615 is described in the above referenced patent issued to van der Wal.

Returning to FIG. 8, section 800a, the luminance component signal is provided to filter unit 615 which generates a Gaussian image signal G1(t)Y of the luminance component signal which is provided via crosspoint switch circuitry 640 to frame store controller 605. The frame store controller 605 subsamples and stores the Gaussian image signal G1(t)Y in memory 550a. The subsampling and storing operations of the frame store controller 605 are described below. The input luminance component signal Y (hereinafter Gaussian image signal G0(t)Y) is provided to frame store controller 610 which stores the Gaussian image signal G0(t)Y. Frame store controllers 605 and 610 operate in the same manner and are described below after the description of the operation of the stabilization system 500. In parallel, the luminance component of the previous image G0(t-1)Y stored in memory 550b is retrieved using frame store controller 610 which generates an intermediate warped image. The intermediate warped image is further warped using filter unit 620. Filter unit 620 may be a separable five by five filter which includes 10 multipliers.

The previous image G0(t-1)Y is warped using alignment parameters C(i,j) produced in the previous frame interval by section 800c, shown in FIG. 8. The peak alignment parameters C(i,j)peak from the previous frame interval are provided to microprocessor 540. As is described below, process block 820 is repeated to produce the peak alignment parameters C(i,j)peak between the Laplacian images Ln(t-1) and Ln(t). The peak alignment parameters C(i,j)peak for each level further refine the warping process to stabilize the image. Microprocessor 540 accumulates the peak alignment parameters C(i,j)peak generated for each level of the Laplacian pyramid from the most significant bit position to the less significant bit position. In other words, microprocessor 540 produces an accumulated peak alignment parameter C(i,j)peak from the alignment parameters produced at each level of the Laplacian pyramid. Microprocessor 540 uses the accumulated alignment parameter to program filter unit 620 and frame store controller 610 to warp the luminance component signal of the input image G0(t-1)Y as described below.

The generation of the alignment parameters is described below. The alignment parameters include an integer value and a fractional value. An intermediate warped image can be generated using the integer part C(xi,yi) of the alignment parameters C(x,y). The integer part C(xi,yi) of the alignment parameters C(i,j) includes a horizontal component xi and a vertical component yi which specify a translation of the previous image G0(t-1)Y in the horizontal and vertical directions, respectively. The frame store controller 610 retrieves pixel values from memory 550b which are included in a region of interest RD_ROI, shown in FIGS. 10–11, and described below. The region of interest RD_ROI is a rectangular region in memory 550b, shown in FIG. 6. When pixel values are retrieved from memory 550b using frame store controller 610, shown in FIG. 6, the size and starting coordinates of the read region of interest RD_ROI in memory 550b are specified.

Figure 10:
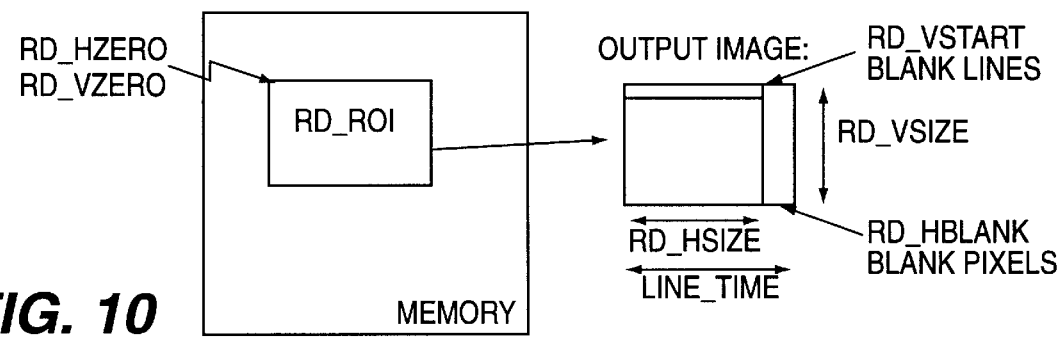
FIGS. 10–12 are data structure diagrams illustrating the read region of interest RD_ROI in memories 550a and 550b shown in FIG. 6.

Frame store controller 605 warps the previous image G0(t-1)Y by shifting the read region of interest RD_ROI, shown in FIG. 10, in response to the horizontal component xi and vertical component yi of the integer part of the alignment parameters C(i,j). For example, assume the region of interest RD_ROI to be retrieved from memory 550b has starting coordinate values (RD_HZERO=2, RD_VZERO=8) where data value RD_HZERO, shown in FIG. 10, is the horizontal starting coordinate of the read region of interest RD_ROI and data value RD_VZERO, shown in FIG. 10, is the vertical starting coordinate of the read region of interest RD_ROI. If the horizontal component xi is four and the vertical component yi is five, the starting coordinates are adjusted to (RD_HZERO=6, RD_VZERO=13). As a result, image data which is retrieved from memory 550b by frame store controller 610 is warped by the integer part of the alignment values C(i,j).

Next, filter unit 620, interpolates the intermediate warped image using the fractional part of the peak alignment parameter C(i,j)peak to complete the warping of the image. Microprocessor 540, shown in FIG. 5, uses the peak alignment parameter C(i,j)peak to program the filter unit 620, shown in FIG. 6, to warp the luminance component of the image. The peak alignment parameter C(i,j)peak specifies the degree to which the image is warped.

Each of the pixel values in the image are warped by the peak alignment parameter C(i,j)peak to align the images in the frames as is shown in FIGS. 2(a)–2(d). Thus, it is desirable to warp each pixel value in the frame using the same fractional translation. Therefore, filter unit 620 may be programmed to implement a two-by-two bilinear interpolation operation. Alternatively, filter unit 620 may be a two-by-two separable filter. One such bilinear interpolation filter is TRW part number TMC2301 described in Real-time Bilinear Interpolation Using the TMC2241 by Steve Gomez, TRW LSI Products Division, and dated Jan. 21, 1989, which is incorporated herein by reference for its teachings on bilinear interpolation.

For example, if the fractional part C(xf,yf) of the alignment values is 0.3 pixel values in the horizontal direction, and 0.4 pixel values in the vertical direction, then a two tap horizontal filter with coefficient values 0.7 and 0.3, and a two tap vertical filter with coefficients 0.6 and 0.4 are used to implement the bilinear interpolation. The filter unit 620 may also implement higher order interpolation operations to increase the quality of the image interpolation.

Returning to FIG. 8. once section 800*a* is complete, the steps shown in section 800*b* are performed. The Gaussian image Gn(t)Y is retrieved from memory 550*a* using frame store controller 605. The Gaussian image Gn(t)Y is filtered using filter unit 615 to produce the next level Gaussian image Gn+1(t)Y. For example, if Gaussian image G1(t)Y is retrieved from frame store controller 605, filter unit 615 produces Gaussian image G2(t)Y. Filter unit 615 performs the same operations as described above with reference to section 800*a* and Gaussian image G1(t)Y. Gaussian image Gn+1(t)Y is then stored in memory 550*a* using frame store controller 605. Frame store controller 605 subsamples the Gaussian image Gn+1(t)Y prior to storage of the Gaussian image in memory 550*a*.

Filter unit 615 also subtracts the Gaussian image Gn+1(t)Y from Gaussian image Gn(t)Y to produce Laplacian image Ln(t). Laplacian image Ln(t) is then processed using LUT 645 which is used to enhance the Laplacian image Ln(t) to produce image Ln(t)'. LUT 645 is an eight bit LUT. The enhanced Laplacian image Ln(t)' is then stored in memory 550*b* using frame store controller 610.

The above steps of section 800*b* are repeated for n equals 2, 3, and 4 to generate Laplacian images L1(t) through L4(t) and Gaussian images G2(t) through G4(t). As each successive image contains one fourth of the number of pixels as the previous image, the processing time to repeat the steps of section 800*b* is approximately the same as the processing time for generating Gaussian image G0(t) in section 800*a*. Laplacian images L1(t) through L4(t) are each stored in memory 550*b* using frame store controller 610. The above steps for generating Gaussian image Gn+1(t) and Laplacian images L1(t) through L4(t) are completed in about 3.2 msec.

In parallel with the steps described above in section 800*b*, the chrominance component of the previous Gaussian image G0(t−1)C is retrieved from memory 550*b* and warped using frame store controller 610 and filter unit 620. Frame store controller 605 and 610 operate in the same manner to warp the chrominance component as described above to warp the luminance component. The warping of one field or half a frame of the previous color image data is completed in about 3.7 msec. Once the color component of the previous Gaussian image G0(t−1)C is warped, it is stored in frame buffer 570. The warped color component is provided to frame buffer 570 via crosspoint switch 640, shown in FIG. 6, through output terminal OUT1.

As described above, the stabilization process first performs image correlations over a five-by-five region of Laplacian image L4 to produce alignment parameters C4(i,j). The maximum alignment parameter C4(i,j)max is then selected from the alignment parameters C4(i,j). Finally, the peak alignment parameter C4(i,j)peak is produced. The peak alignment parameter C4(i,j)peak is then used to warp Laplacian image L3. In the same manner as for level four, the peak alignment parameter C3(i,j)peak is produced for level three. The peak alignment parameter C3(i,j)peak is used to warp the Laplacian image L2. In the same manner as for level three, the peak alignment parameter C2(i,j)peak is produced for level two. Section 800*c* shown of FIG. 8 illustrates how these operations are implemented in the PPP 560.

Laplacian image L4(t−1) is retrieved from frame store controller 610 and provided to filter unit 620. Laplacian image L4(t−1) is passed through filter unit 620 and provided to delays 625*a* and 625*b*. In other words, Laplacian image L4(t−1) is not warped. The Laplacian image L4(t) is retrieved from memory 550*b* using frame store controller 610 and provided to delays 625*a* and 625*b*. The retrieval of Laplacian image L4(t) is delayed to compensate for the time delay incurred when Laplacian image L4(t−1) is passed through filter unit 620.

As described above, the first image to be warped in the Laplacian pyramid is Laplacian image L3(t−1) using alignment parameters C4(i,j). If Laplacian image L4(t−1) is provided to filter unit 620, filter unit 620 passes the Laplacian image L4(t−1) to delays 625*a* and 625*b* without warping.

Delays 625*a* and 625*b*, multipliers 630*a* and 630*b*, accumulators 635*a* and 635*b* are used to implement equation (3) above where n equals 4 (n=4). Delays 625*a* and 625*b* are at least four pixel value delays long so that the appropriate pixels values in the Laplacians images L4(t−1) and L4(t) may be multiplied using multipliers 635*a* and 635*b* and subsequently accumulated using accumulators 635*a* and 635*b* to generate alignment parameters C4(i,j). The alignment parameters C4(i,j) are provided to statistical unit 647, shown in FIG. 6, which determines the maximum alignment parameter C4(i,j)max. Then, the alignment parameters C4(i,j) adjacent to the maximum alignment parameter C4(i,j)max are provided to filter unit 620. Filter unit 620 uses a two-by-two neighborhood of alignment parameters C4(i,j) including the maximum alignment parameter C4(i,j)max to generate the peak alignment parameter. Filter unit 620 implements a bilinear interpolation to generate the peak alignment parameter C4(i,j) peak from the two-by-two pixel neighborhood.

The peak alignment parameter C4(i,j) is provided to processor 540. Generation of the peak alignment parameter Cn(i,j) includes three iterations of the steps described above in section 800*c*. The time to complete these steps is about 6.6 msec. After each iteration, microprocessor 540 accumulates the peak alignment parameters C4(i,j)peak, C3,(i,j)peak, and C2(i,j) for each level of the Laplacian pyramid from the most significant bit position to the less significant bit position. Microprocessor 540 uses the accumulated alignment parameter to program filter unit 620 and frame store controllers 605 and 610 to warp the images.

The same steps described above are used to generate the alignment parameters Cn(i,j) for level three (n=3) and two (n=2) except that the previous image is warped using the accumulated peak alignment parameter. For example, Laplacian image L3(t−1) is warped by filter 620 in response to the accumulated peak alignment parameter which is peak alignment parameter C4(i,j) for level 4. Laplacian image L2(t−1) is warped by filter 620 in response to the accumulated peak alignment parameter which is an accumulation of peak alignment parameter C4(i,j) for level 4 and peak alignment parameter C3(i,j) for level 3.

In parallel with the steps described above in section 800*c*, the current chrominance component of the current image G0(t) is provide to frame store controller 605 and stored in memory 550*a* via crosspoint switch 620, shown in FIG. 6. Transfer and storage of the chrominance component is about 3.7 msec. Pixel values are stored in frame buffers 570 and 580 at a clock rate of 50 MHz, while data is retrieved from the frame buffers 570 and 580 by the video output encoder 590 at substantially the same time at a clock rate of 12.5 to 13.5 MHz, which requires about 16 msec to read the data stored in the buffers. The frame buffers 570 and 580 are double buffered.

Returning to FIG. 5, the stabilized luminance component signal Y and the stabilized chrominance component signals Cv and Cu are respectively provided from frame buffers 580 and 570 to encoder 590. Encoder 590 combines the components to produce a color video signal at output terminal OUT. The encoder 590 is, for example, a Philips part number SAA7187 device.

In FIG. 5, microprocessor 540 is used to program the encoder 590 and decoder 510, and to control the image processing functions of the PPP 560, via processor signal PS. Microprocessor 540 is also used to program registers in the frame store controllers 605 and 610 for each of the steps of the stabilization process described above. Microprocessor 540 should operate at a rate of, for example, 20 MHz, so that reprogramming time between each processing step of the stabilization process is minimized. Microprocessor 540 has a program memory for storing code to operate the stabilization system 500. Microprocessor 540 may also include connections to an external EPROM, e.g.—a FLASH EPROM (not shown), for boot-up procedures for the stabilization system. In an alternative embodiment, microprocessor 540 may be incorporated into PPP 560. This may reduce the manufacturing cost of such a system.

Control circuitry 595 controls the interface between input and output buses of decoder 510 and encoder 590, and the interface and counters (not shown) to control frame buffers 520, 530, 570, and 580. Control circuitry 595 also extracts the timing signal HA and signal VA which are used to control the operation between buffers 520 and 530 and PPP 560, and between the buffers 570 and 580 and encoder 590. Control circuitry 595 also controls the interface between microprocessor 540 and PPP 560. Control circuitry 595 controls these operations via control signals CS.

Description of Frame Store Controller

The frame store controllers 605 and 610 and memories 550a and 550b, shown in FIG. 6, are described below. The frame store controllers 605 and 610 provide triple port access to memories 550a and 550b for video processing. The triple port access includes the substantially simultaneous writing of a continuous video data stream into memories 550a and 550b, shown in FIG. 6, reading a continuous video data stream from memories 550a and 550b, and providing random access to data in memories 550a and 550b.

Figure 9:
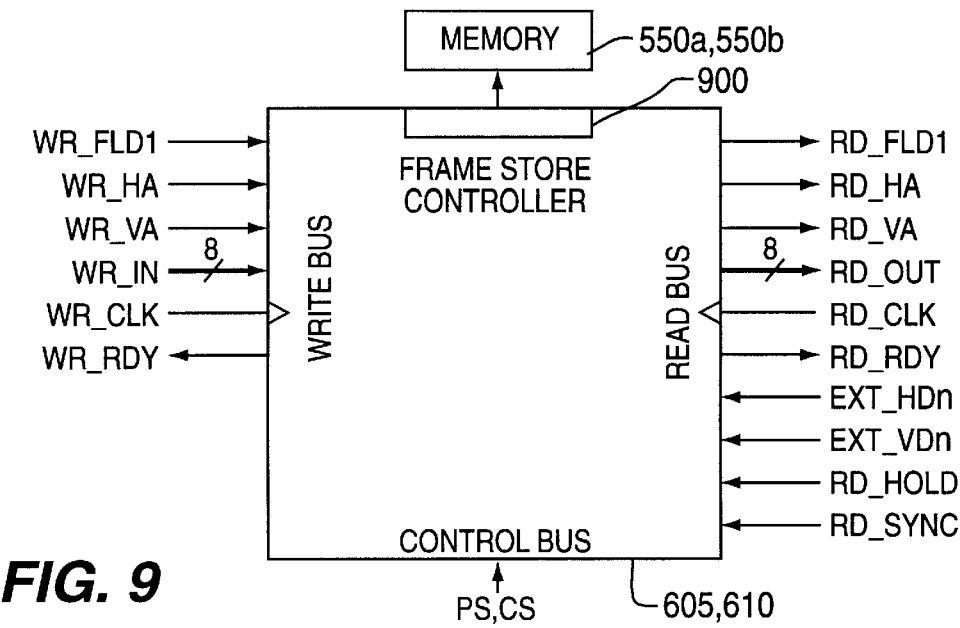
FIG. 9 is a block diagram of the frame store controllers 605 and 610 shown in FIG. 6 in accordance with an exemplary embodiment of the present invention.

The Gaussian image signal Gn(t) and Laplacian image signal Ln(t) are retrieved and stored in memories 550a and 550b during the stabilization process. The retrieval and storage of image data in memories 550a and 550b are described below. The key signals provided to and from frame store controller 605 are shown in FIG. 9.

The frame store controllers 605 and 610, shown in FIG. 6, are responsible for implementing pipelined read and store operations within memories 550a and 550b in a dual-ported fashion. The frame store controller 605 and 610, execute rectangular region-of-interest (ROI) operations for data retrieval or storage operations, because the images are stored and retrieved in a two-dimensional manner from memories 550a and 550b. The frame store controllers 605 and 610 may also resample the images on read and store operations, with nearest-neighbor pixel interpolation on read expansion operations and decimation on store operations.

Figure 23:
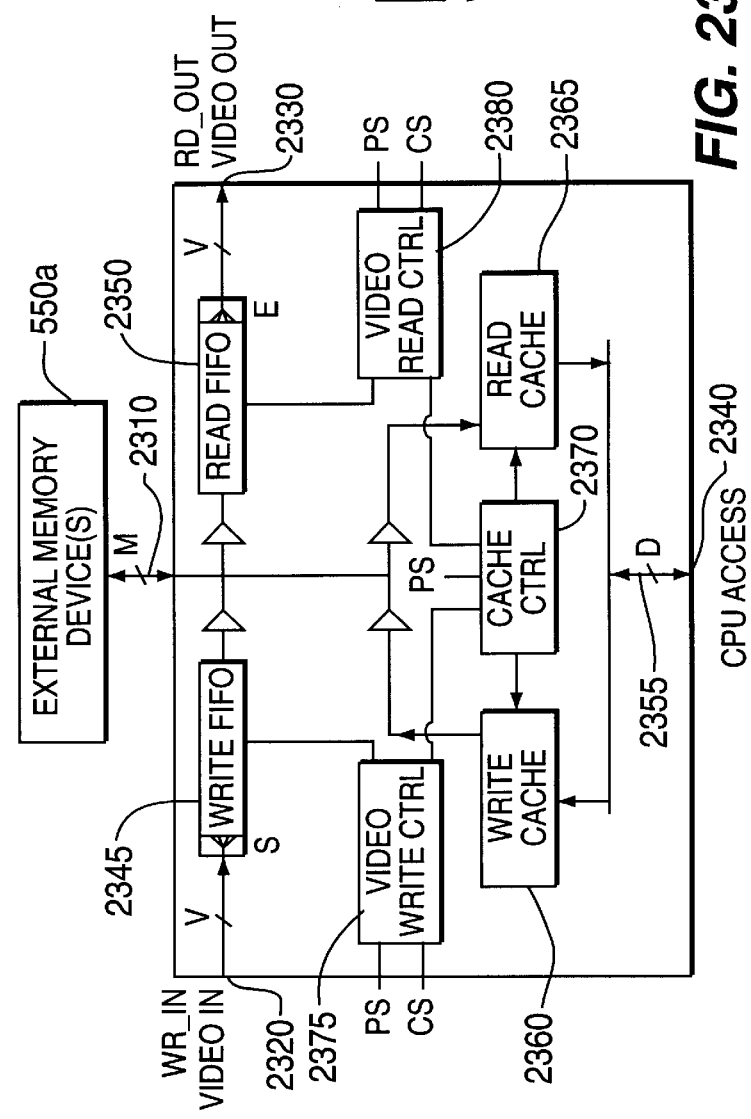
FIG. 23 is a block diagram of the interface circuitry 900 of the frame store controllers 605 and 610 shown in FIG. 9 in accordance with an exemplary embodiment of the present invention.

The frame store controllers 605 and 610 also perform single pixel value retrieval and store operations in a random access manner from the global bus 670, shown in FIG. 6. This allows processor 540 and control circuitry 595 to access the memories 550a and 550b independently of the pipelined retrieval and store operations that may be executed within the frame store controllers 605 and 610. Access port 2340 for the global bus is shown in FIG. 23. Access port 2340 of the frame store controller is enhanced using caching to take advantage of the faster accessing modes of the frame store memories 550a and 550b, shown in FIG. 6, when pixel accesses occur over the global bus.

Figure 24:
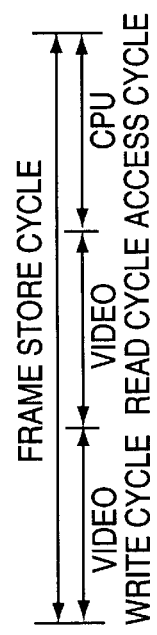
FIG. 24 is timing diagram useful for explaining the operation of interface circuitry shown in FIG. 23.

FIG. 23 is a block diagram of the interface circuitry of the frame store controllers 605 and 610 which implement the triple port access. The interface circuitry includes FIFOs, data caches, and control logic for controller retrieval and storage operations. As is shown in FIG. 24, access to memories 550a and 550b, shown in FIG. 6, are scheduled so that optimum use can be made of the data burst capability of the memories 550a and 550b.

Figure 11:
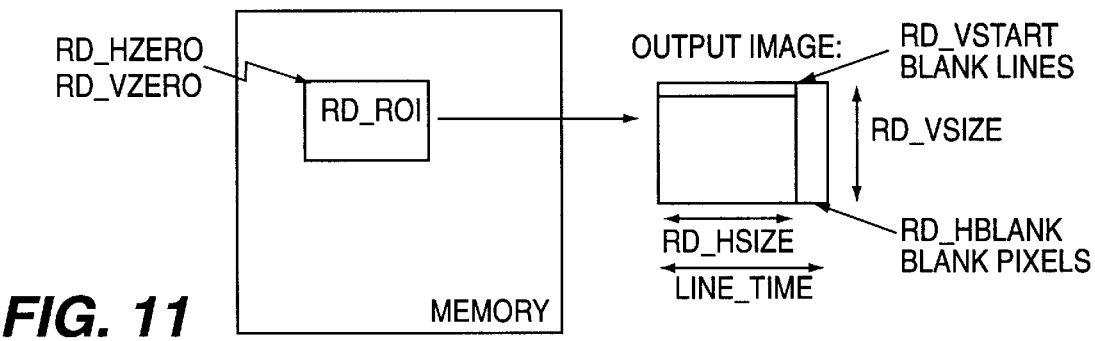
Figure 12:
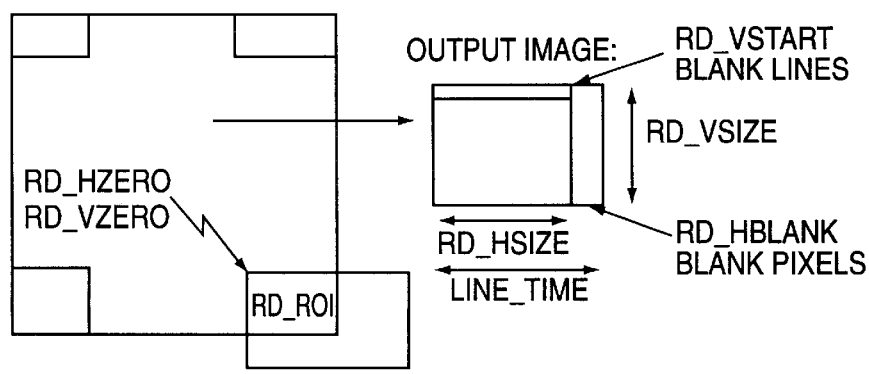
Figure 15:
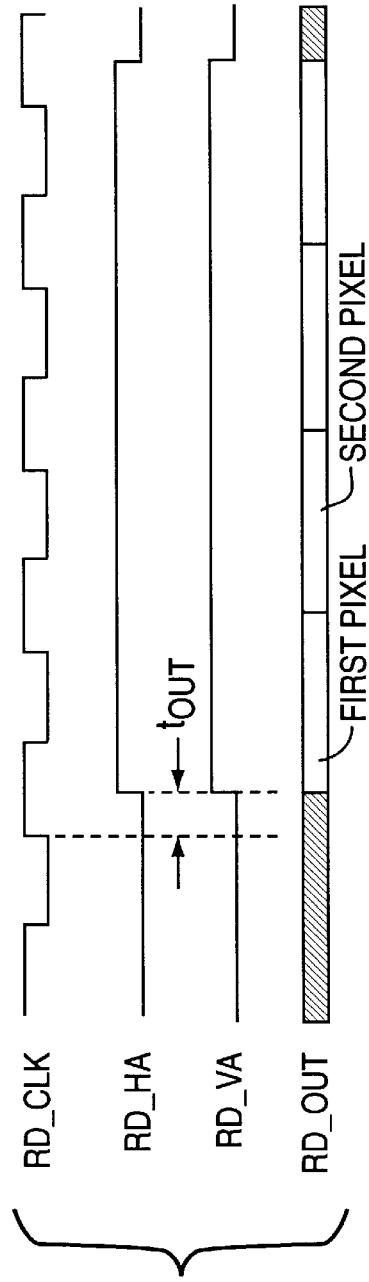

Image data is retrieved by the frame store controller 605 in a continues raster scan from a region of interest RD_ROI, shown in FIGS. 10–12, synchronous with read clock timing signal RD_CLK, shown in FIGS. 13–15. When data is retrieved from memory 550a, shown in FIG. 6, two timing signals RD_HA and RD_VA, are generated which indicate when the retrieved data signal RD_OUT, shown in FIGS. 13–19, is valid. FIGS. 13–19 and 22 are timing diagrams which illustrate the operation of the frame store controller shown in FIG. 9. Timing signal RD_HA is in a logic high state when the data in a line is valid (i.e. during the active picture interval) and in a logic low state otherwise (i.e. during the horizontal blanking interval). Timing signal RD_VA is in a logic high state when the data in a line is valid (i.e. during the active picture interval) and in a logic low state otherwise (i.e. during the vertical blanking interval). Alternatively, a field signal, described below, may be used to read data using interlace read operations.

Figure 16:
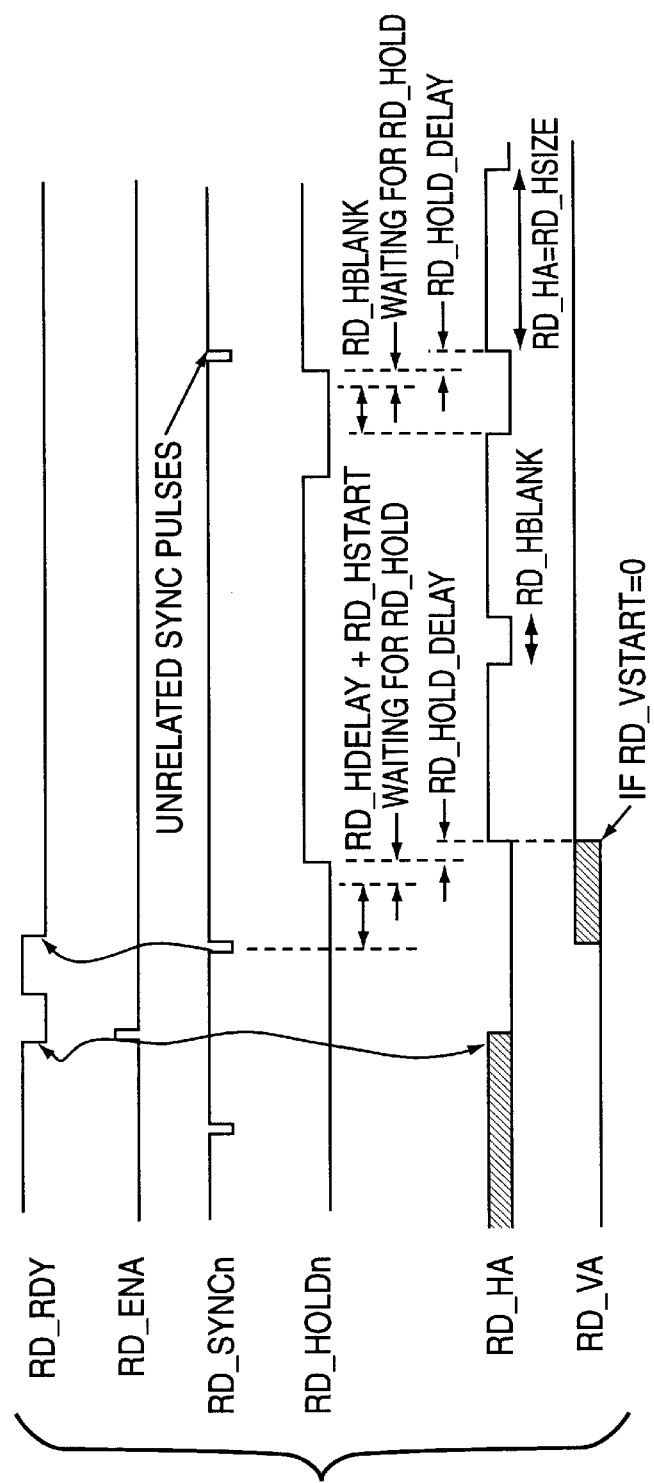
Figure 17:
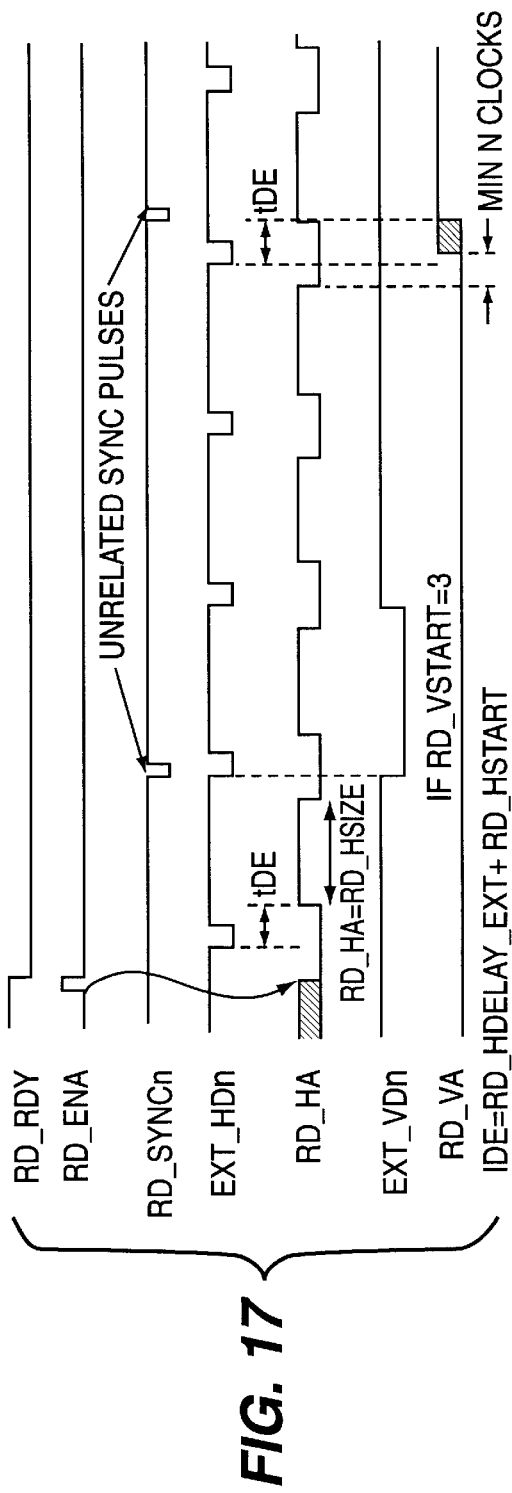
Figure 18:
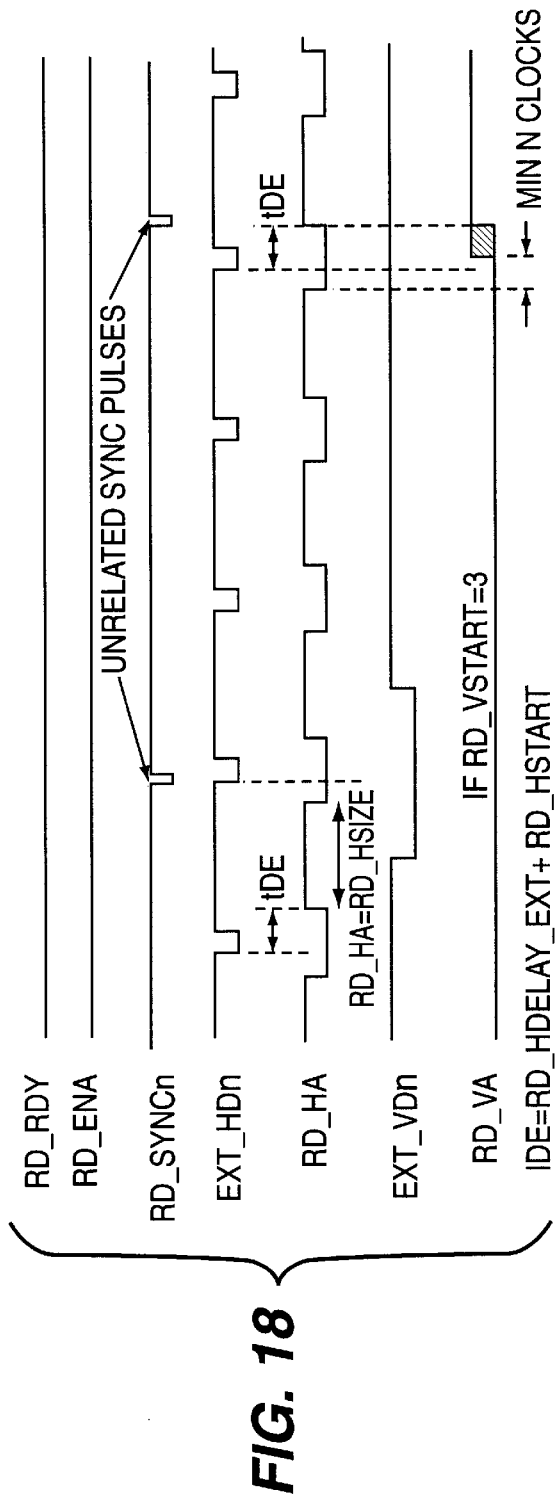

In addition, each horizontal active period can be delayed in response to a signal RD_HOLD, shown in FIG. 9, provided to frame store controllers 605 and 610, shown in 6. FIG. 16 illustrates the operation of the frame store controller 605 when the signal RD_HOLD is used. When the signal RD_HOLD is low and the register RD_HOLD_ENA is set, the read operation is held during the time specified by data value RD_HBLANK, shown in FIGS. 14 and 16, until signal RD_HOLD is high. Alternatively, the read operation timing can be slaved to the horizontal drive signal EXT_HDn and vertical drive signal EXT_VDn, each shown in FIGS. 17–19, when the bit value RD_EXT_ENA is set. FIGS. 17–19 illustrate the operations of the frame store controller 605 when read operation timing is slaved to external drive signals. Retrieval of data is initiated in response to RD_SYNCn signal, shown in FIGS. 14 and 16, after the register RD_ENA has been set.

As is shown in FIGS. 13 and 14, when the read ready signal RD_RDY is logic-one, it indicates the data retrieval operation is idle. The read ready signal RD_RDY is changed to a logic-zero after the register RD_ENA is accessed. The read ready signal RD_RDY changes to a logic-one when the data retrieval operation is activated and changes to a logic-zero after the signal RD_SYNCn pulse and until the data retrieval operation is complete. In continuous mode operation, the read ready signal RD_RDY remains a logic-zero.

The image data to be retrieved is held in memory 550a, shown in FIG. 6. Memory 550a is organized as a two-dimensional array. The logical data bit size, i.e. depth, of the memory 550a is 8 bits or one byte. Data is physically stored, however, as 16 bit data, with even pixels values X0, X2, X4, X6, . . . stored in the upper byte, and the odd pixel values X1, X3, X5, X7, . . . stored in the lower byte.

The width, i.e.—horizontal size, and height, i.e.—vertical size, of memory 550a is one Mbyte and is arranged as a one Kbyte by one Kbyte array. Memory 550a is not limited to one Mbyte and may vary depending on the particular application and memory used. Memory 550a is, for example, two 256 k by 16 bits video RAM (VRAM) chips where the combined VRAM chips hold 1024 K 8-bit pixel values. Therefore, memory 550a has a logical address structure which stores 1024 pixel values by 1024 pixel values.

Data stored in memory 550a is retrieved using a continues raster scan type read from a region of interest RD_ROI, shown in FIGS. 10–12, synchronous with signal RD_CLK, shown in FIG. 15. After all read parameters are programmed, described below, retrieval of data from the memory 550a is initiated in response to signal RD_ENA, shown in FIGS. 13–14. As is shown in FIGS. 13–15, data signal RD_OUT and timing signals RD_VA and RD_HA are generated in response to the signal RD_SYNCn pulse. The data retrieval operations of frame store controllers 605 and 610 are synchronized by programming the registers (described below) of each frame store controller 605 and 610, setting register RD_ENA, and then providing signal RD_SYNCn pulse to both frame store controllers 605 and 610. For example, as shown in FIG. 8, Gaussian image signals G0(t–1) and Gn(t) respectively are retrieved from frame store controllers 610 and 605 at the same time.

The first pixel, i.e.—first valid data, of the data retrieval operation is defined by the data values stored in registers RD_HZERO and RD_VZERO. The first pixel appears a predetermined number of clock cycles of the read timing signal RD_CLK, shown in FIG. 15, after a pulse in signal RD_SYNCn. The appearance of the first pixel value in clock cycles is defined by the combination of data values stored in registers RD_HSTART and RD_VSTART and an inherent delay time delay RD_HDELAY. RD_HDELAY is the inherent fixed horizontal time delay of the read operation relative to the signal RD_SYNCn pulse. Data values in registers RD_HSTART and RD_VSTART are programmable so that read operations from two sources can be aligned in time. These registers are programmed using microprocessor 540 via signal PS.

The region of interest RD_ROI is shown in FIGS. 10–12. The region of interest is defined by data values RD_HZERO, RD_VZERO, RD_HSIZE, and RD_VSIZE. Data value RD_HZERO is the horizontal, i.e.—column, coordinate value of the region of interest RD_ROI. Data value RD_VZERO is the vertical, i.e.—row, coordinate value of the upper left most pixel value of the region of interest RD_ROI. Data value RD_HSIZE is the horizontal size, i.e.—width, of the region of interest RD_ROI to be retrieved and specifies the number of clock cycles (pixel values) that a horizontal line of the region of interest is to be read. Data value RD_VSIZE is the vertical size, i.e.—height, of the region of interest RD_ROI to be retrieved. As shown in FIG. 12, if the region of interest crosses the memory boundary, the retrieval of data wraps around the boundaries of the image data stored in memory 550a.

As is described above, during the stabilization process shown in FIG. 8, frame store controllers 605 and 610 produce an intermediate warped image which is warped by the integer portion of the alignment parameters Cn(i,j). The intermediate warped image is generated by adjusting the data values in registers RD_HZERO and RD_VZERO. The horizontal component x is added to the data value RD_HZERO and the vertical component y is added to the data value in register RD_VZERO to adjust the starting position of the region of interest RD_ROI, shown in FIGS. 10–12. By adjusting the starting position of the region of interest RD_ROI, the image data is warped to produce the intermediate warped image when the image data is retrieved from memories 550a and 550b.

After data retrieval is initiated, each pixel value in the horizontal line with size RD_HSIZE is retrieved in consecutive order at a rate determined in response to read timing signal RD_CLK, shown in FIG. 15. There is a minimum programmable time between each horizontal line scan retrieval which is defined by the data value stored in register RD_HBLANK. This value specifies a number of read cycles corresponding to a horizontal blanking interval. The data value stored in register RD_VSIZE specifies the number of lines to be read. After the number of lines defined by register RD_VSIZE are retrieved, the data retrieval operation is completed.

Alternatively, the data retrieval operation of the frame store controller 605 may be set to continuous operation where the read operation will repeat after a programmable number of lines defined by data value RD_VBLANK. The continuous operation can be terminated by resetting the control bit that enables the continuous operation.

All read operations can be terminated and placed in an idle state by setting the data value in register RD_RST. The signal RD_HA, shown in FIGS. 13–19 is changed to a logic-zero when data retrieval is terminated. Otherwise, the signal RD_HA is continuously generated until register RD_ENA is set. Retrieval of image data is terminated by setting register RD_ENA. In this case, the next image data retrieval operation is initiated by the frame store controller 605.

A zoom factor may also be applied to the image data during retrieval operation. The region of interest RD_ROI may be adjusted independently in the horizontal and the vertical direction of the image. The number of pixels values in a line and the number of lines is increased by repeating the pixel values/lines retrieved from the region of interest by the respective data values in registers RD_HZOOM and RD_VZOOM (not shown). Registers RD_HZOOM and RD_VZOOM are in frame store controllers 605 and 610. The image may be adjusted by a factor of, for example, one, two, to sixteen. The data values in registers RD_HSIZE and RD_VSIZE represent the size of the image after the zoom factors have been applied.

An example of a data retrieval which performs a zooming operation is described below. The read region of interest RD_ROI and the zoom data values are: RD_HZERO=10; RD_VZERO=8; RD_HSIZE=64; RD_VSIZE=60; RD_HZOOM=2; and RD_VZOOM=2; RD_HSTART=20; RD_VSTART=2; RD_HBLANK=32; RD_VBLANK=5; and RD_HDELAY=6.

In response to these data values, an image segment having 32 pixel values by 30 pixel values is retrieved starting at coordinates values [10, 8] in memory 550a. The frame store controller 605 increases the number of pixel values by a factor two by repeating each pixel value in the horizontal and vertical directions. For example, if pixel values X11, X12, X13, . . . are retrieved from line one and pixel values X21, X22, X23, . . . are retrieved from line two, in the region of interest RD_ROI stored in memory 550a, shown in FIG. 6, frame store controller 605, shown in FIG. 6, produces four corresponding lines in signal RD_OUT as shown in Table 2 below.

TABLE 2

| Line Number | Pixel Values |
| --- | --- |
| 1 | X11, X11, X12, X12, X13, X13 . . . |
| 2 | X11, X11, X12, X12, X13, X13 . . . |
| 3 | X21, X21, X22, X22, X23, X23 . . . |
| 4 | X21, X21, X22, X22, X23, X23 . . . |

The first pixel valve is provided from frame store controller 605 two hundred eighteen read clock cycles of read clock signal RD_CLK, shown in FIG. 15, after the negative edge of signal RD_SYNCn pulse, shown in FIGS. 13 and 14, as determined in accordance with equations (2) and (3) below.

$$RD\_HDELAY+RD\_HSTART+VSTART*line\_time=6+20+(2*96)=218 \quad (2)$$

$$line\_time=RD\_HSIZE+RD\_HBLANK=96 \quad (3)$$

The total time to provide all of the pixel values from the frame store controller is 5728 clock cycles of read clock signal RD_CLK and is determined in accordance with equation (4) below.

$$RD\_VSIZE*line\_time-RD\_HBLANK=60*96-32=5728 \quad (4)$$

If the frame store controller 605 is operating in a continuous data retrieval mode, the time between the last pixel of the previous image and the first pixel of the next image is 512 clock cycles of read clock signal RD_CLK and is determined in accordance with equation (5) below.

$$RD\_VBLANK*line\_time+RD\_HBLANK=5*96+32=512 \quad (5)$$

The total time to retrieve an entire image frame stored in memory 550a in continuous operation is 6240 clock cycles of read clock signal RD_CLK and is determined in accordance with equation (6) below.

$$(RD\_VSIZE+RD\_VBLANK)*line\_time=6240 \quad (6)$$

The frame store controller 605 performs data retrieval in progressive (non-interlace) mode. When the bit value RD_INTERLACE of the register RD_CTRL is changed to a logic 1, data retrieval is performed in interlace mode. The read region of interest RD_ROI is a frame including two fields. One field is half a frame consisting of alternate lines of the frame. Field one is the field that starts with the first line of the frame and field two is the field that starts with the second line of the frame.

The bit values RD_FIELD1_ENA and RD_FIELD2_ENA of register RD_CTRL identify which fields are retrieved. For example, if both bit values RD_FIELD1_ENA and RD_FIELD2_ENA are a logic-one, then a single data retrieval operation includes the retrieval of two consecutive field images, field one followed by field two. The time duration between the retrieval of the two fields is defined by data value RD_VBLANK. If only one of the bit values RD_FIELD1_ENA and RD_FIELD2_ENA is a logic-one, then the single data retrieval operation includes the retrieval of only one field. For example, if bit value RD_FIELD1_ENA is a logic-one and bit value RD_FIELD2_ENA is a logic-zero, field one is retrieved. If bit values RD_FIELD1_ENA and RD_FIELD2_ENA are both logic-zero, then no read operation occurs. Signal RD_FLD1 indicates which field is being read out. When signal RD_FLD1 is a logic-one, field one is being retrieved and when signal RD_FLD1 is a logic-zero, field two is being retrieved.

All data retrieval may be continuous or non-continuous. When data retrieval is continuous, it is initiated in the same manner as the non-continuous data retrieval. Data values stored in registers RD_HSTART and RD_VSTART are used to retrieve the first frame and are not subsequently used to determine the start of the retrieval of subsequent frames or fields. After the first frame or field is retrieved, the data retrieval operation is repeated. There is a blanking interval between the repeated data retrieval operations set by data value RD_VBLANK.

When data is retrieved continuously, signal RD_RDY is a logic low. The continuous mode may be stopped by changing bit value RD_CONTINUOUS of register RD_CTRL to logic-zero. The current data retrieval operation is then completed and the read ready signal RD_RDY is changed to a logic-one. An interrupt request output may be generated after the completion of a data retrieval operation using register RD_IRQ_ENA. This data bit value is also written into the FS_STATUS register. The default setting is zero which indicates disabled.

The read hold operation is described below with reference to FIG. 16. During the read hold operations, the active line time of signal RD_HA is delayed in response to signal RD_HOLDn, shown in FIG. 16. When signal RD_HOLDn is a logic-zero the active line time is delayed. When signal RD_HOLDn is changed to a logic-one, the line data becomes active after a number of read cycles defined by data value RD_HOLD_DELAY which specifies the delay as a number of clock cycles. Signal RD_HOLDn is changed to a logic low when bit value RD_HOLD_ENA of register RD_CTRL is set to a logic-one.

The active line time is delayed when the output data signal RD_OUT is provided to a limited or asynchronous data throughput, such as a FIFO. It is desirable that the component circuitry to which data signal RD_OUT is supplied to hold an entire line of the frame. Signal RD_HOLD is an asynchronous signal and should be internally synchronized with signal RD_CLK.

FIGS. 17–19 are timing diagrams illustrating the operation of the frame store controller 605 when the data retrieval operation is slaved to signals EXT_HDn and EXT_VDn. FIG. 17 illustrates the operation of the frame store controller 605 when (1) the first field is retrieved in interlace mode or (2) when a frame is retrieved in non-interlace mode. FIG. 18 illustrates the operation of the frame store controller 605 when the second field is retrieved in interlace mode. FIG. 19 illustrates the operation of the frame store controller 605 when the data retrieval operation is saved to signals EXT_HDn and EXT_VDn and for different horizontal sizes of the region of interest, shown in FIGS. 10–12, specified by the data value in register RD_HSIZE.

When the bit value RD_EXT_ENA of register RD_CTRL is one, the data retrieval operation is slaved to signals EXT_HDn and EXT_VDn and frame store controller 605 ignores signal RD_SYNCn pulses. After register RD_EXT_ENA is set, the data retrieval operation is initiated when signals EXT_HDn and EXT_VDn are a logic-zero at the same time. In non-interlace mode, data retrieval of a frame is initiated and in interlace mode, the data retrieval of the field is initiated.

The first active line may be delayed by a number lines determined by data value RD_VSTART in response to the number of falling edges of signal EXT_VDn. The number of lines is generated in response to the falling edge of signal EXT_VDn where each falling edge is counted as one line.

The active pixel values in a line may be delayed by a number pixel values determined by data value RD_HSTART in response to the number of falling edges of signal EXT_HDn. The number of pixel values is generated in response to the falling edge of signal EXT_HDn where each falling edge is counted as one pixel value.

As shown in FIG. 18, in interlace mode, the second field is defined by the falling edge of signal EXT_VDn that is not necessarily coincident with the falling edge of signal EXT_HDn. The next falling edge of signal EXT_HDn is then the start of the data retrieval operation of the second field. If one of the bit values RD_HELD1_ENA and RD_HELD2_ENA of register RD_CTRL is not set, then the data retrieval operation does not retrieve data during that field. Signal RD_FLD1 indicates the switch time between field one and field two.

The sum of data value RD_HSTART and data value RD_HSIZE should be smaller than the total line time of signal EXT_HDn. The sum of data value RD_VSTART and data value RD_VSIZE should be smaller than the frame or field time of signal EXT_VDn.

In continuous mode and external timing mode, signal RD_RDY is a logic-zero. In non-continuous mode, signal RD_RDY becomes a logic-one at the end of data retrieval of the frame in non-interlace mode or the second field in interlace mode. In the external timing mode, signals RD_HA, RD_VA, and RD_FLD1 are the same as when internal timing is used.

The write operation of frame store controller 605 is examined below with reference to FIG. 22. Image data is stored in memory 550a using frame store controller 605 during the write operation. The write operation is defined as a continuous raster scan write to a write region of interest WR_ROI, shown in FIGS. 20 and 21, of memory 550a synchronous with write clock signal WR_CLK. Register WR_ENA is set after all other write parameters are programmed. Setting register WR_ENA activates the write operation, which then waits for the beginning of the input image data signal WR_IN as defined by signals WR_HA and WR_VA. Signal WR_HA is in a logic high state when the data in a line is valid (i.e. during the active picture interval) and in a logic low state otherwise (i.e. during the horizontal blanking interval). Timing signal WR_VA is in a logic high state when the data in a line is valid (i.e. during the active picture interval) and in a logic low state otherwise (i.e. during the vertical blanking interval). The rising edge of both signals WR_HA and WR_VA indicates the start of valid data.

The image data signal WR_IN is stored starting at a memory location defined by data values stored in registers WR_HZERO and WR_VZERO, shown in FIGS. 20 and 21. The data values in registers WR_HZERO and WR_VZERO are coordinates at which the image data is to be stored in memory 550a. All valid pixel data identified by signals WR_HA and WR_VA, shown in FIG. 22, are stored in memory 550a, shown in FIG. 6, or subsampled in response to data values stored in registers WR_HSAMPLE and WR_VSAMPLE (as shown in FIG. 21) and then stored in memory 550a, shown in FIG. 6.

Alternatively, the first pixel value stored may be defined by the data values stored in registers WR_HSTART and WR_VSTART relative to the first valid data identified by signals WR_HA and WR_VA. In this case, each horizontal line has a number of pixel values specified by the data value in register WR_HSIZE or the remaining valid data in each horizontal line as defined by signal WR_HA, whichever is smaller, is stored in memory 550a consecutively at the rate determined by the cycles of write clock signal WR_CLK, shown in FIG. 9. This process is repeated when valid data is received from the next line. A total number of lines determined by the data value in register WR_VSIZE or as many active lines that are remaining as valid data, whichever is smaller, are stored memory 550a during this operation.

Pixel values may be stored in memory 550a in an interlace mode, storing one or both fields of a frame. In interlace mode, pixel values are stored in memory in response to signal WR_FLD1, shown in FIG. 9. Signal WR_FLD1 determines were a field in the input image signal WR_IN, shown in FIG. 9, is stored in memory 550a. When signal WR_FLD1 is a logic-one, the input field in input signal WR_IN is stored starting at coordinates in memory 550a defined by the data values in registers WR_HZERO and WR_VZERO. A line counter (not shown) is incremented by two for each subsequent line and each subsequent line of the field is stored in memory 550a at a line position determined by the line counter. When signal WR_FLD1 is a logic-zero, the input field in input signal WR_IN is stored starting at coordinates in memory 550a defined by the data values in registers WR_HZERO and WR_VZERO+1. A line counter (not shown in the drawings) is incremented by two for each subsequent line and each subsequent line of the field is stored in memory 550a at a line position determined by the line counter. The storing of data may also be set to a continuous operation mode, in which data is stored in memory 550a. The write region of interest WR_ROI, shown in FIGS. 20 and 21, is a rectangular region of interest in memory 550a for the write operation.

Prior to the start of data storage in memory 550a, the write registers, described below, are programmed using microprocessor 540, shown in FIG. 5. Then, register WR_ENA, shown in FIG. 22, is set to activate the data storage operation. In response, signal WR_RDY is changed to a logic-zero until the storage operation is complete and the signal WR_RDY changes to a logic-one. The value of signal WR_RDY can be retrieved from register FS_STATUS. In continuous mode, signal WR RDY remains a logic-zero.

Figure 22:
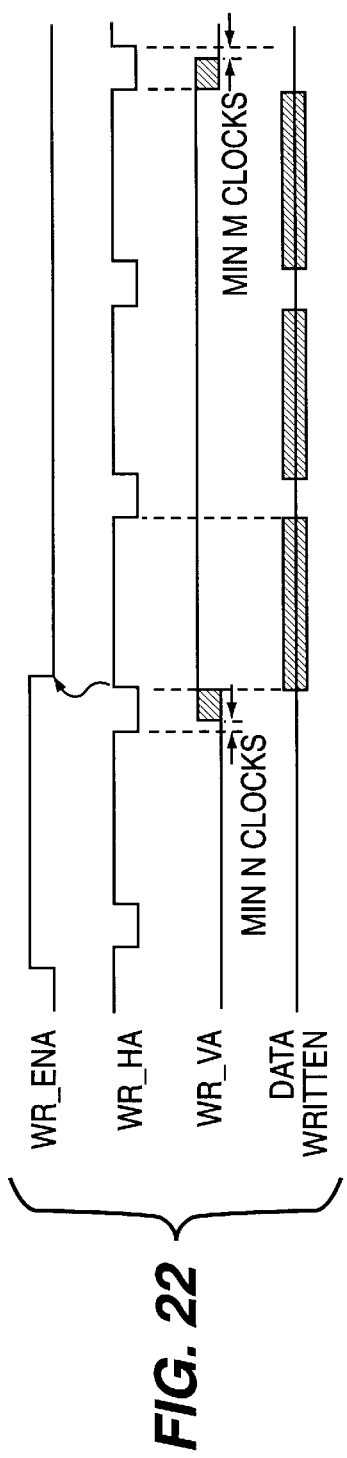
FIG. 22 is timing diagram useful for explaining the write operation of frame store controllers 605 and 610 shown in FIG. 6.

Active pixel values identified by signals WR_HA and WR_VA, shown in FIG. 22, are stored in the write region of interest, shown in FIGS. 20 and 21, in memory 550a, shown in FIG. 6, synchronous with write clock WR_CLK. The active pixel values may be subsampled prior to being stored in memory 550a in response to the data values in registers WR_HSAMPLE and WR_VSAMPLE synchronous with write clock WR_CLK.

The frame store controller 605 includes write registers (not shown in the drawings). Each of the write registers in the frame store controller 605 is programmable using microprocessor 540 using programming signal PS. These registers include WR_CTRL which specifies the WRITE control parameters described below. These parameters include the WR_INTERLACE parameter indicates when set to logic-one that the write operation is interlace mode storing one or two fields. The default setting is zero which indicates non-interlace mode. The WR_FIELD1_ENA parameter enables the storage of the first field in interlace mode. The default setting is one which indicates storage of the field is enabled. The WR_FIELD2_ENA parameter enables the writing of the second field in interlace mode. The default setting is one which indicates storage of the field is enabled. The WR_CONTINUOUS parameter enables image data to be stored to memory 550a continuously. The default setting is zero which indicates storage of image data is not continuous. When set, the WR_IRQ_ENA parameter sets the signal FS_IRQ and a bit in register FS_STATUS at the completion of the storage operation. The default setting is zero which indicates that signal FS_IRQ signal and the bit value of register FS_STATUS are not set. The WR_DATA_ZERO parameter, when one, the pixel values in the write region of interest WR_ROI is set to zero, independent of the input image data signal WR_IN. The default setting is zero.

The input image can be sub sampled when data is written to memory 550a. Sub sampling may be performed independent in the horizontal and the vertical direction of the write region of interest WR_ROI. The sub sampling period can be a factor of, for example, one, two, or sixteen. The phase of the subsample operation is determined by the data values in registers WR_HSTART and WR_VSTART. For example, if the sample period is a factor of two, and the data value WR_HSTART is zero, then pixel values X0, X2, X4, . . . are stored. If the data value in register WR_HSTART is one, then pixel values X1, X3, X5, . . . are stored. If the sample period is a factor of six and the data value in register WR_HSTART is four, then pixel values X4, X10, X16, . . . are stored.

The frame store controller 605 also contains a write mask register WR_MASK (not shown in the drawings). Register WR_MASK is a 16 bit register. The upper 8 bits define the mask for the even pixels in the frame store controller 605, and the lower 8 bits define the mask for the odd pixels in the frame store controller 605. When activated, the pixel values in the input image data signal WR_IN to be stored are masked. A bit plane is masked during the video write operation when the associated bit is set low in the register WR_MASK. In default mode register WR_MASK is set to all ones.

The register WR_MASK is set before the first video write operation after power-up. Subsequently, register WR_MASK may be changed when the mask needs to be changed. Register WR_MASK is not double buffered and, therefore, should be changed when the video write operation is not active, and prior to the setting of register WR_ENA.

The exemplary addressing scheme described above requires a relatively large address bus. In this case it is 19 bits. As an option a page register could be defined to reduce the address bus size. An image frame store operation is implemented by performing read and write operations with two bytes at the same time.

The registers of the frame store controller 605 are double buffered so that these registers can be programmed while the frame store controller is in operation. When the RD_ENA register is accessed the read registers that have been changed will be transferred to the active registers. When WR_ENA register is accessed, the write registers that have been changed will be transferred to the active registers. Registers RD_RST, RD_ENA, RD_CTRL, W&RST, WR_ENA WR_CTRL, and WR_MASK should not be double buffered.

To implement a triple port Frame Store (FS) with such high bandwidth with low-cost memory devices, FIFOs and/ or data caches are implemented internally to the FS controller as is shown in FIG. 23 which illustrates the interface circuitry of the frame store controllers 605 and 610, shown in FIG. 6, with memories 550a and 550b. Access to the memories 550a and 550b are scheduled so that they are consistent with the data burst capability of the memory devices.

As shown in FIG. 23, there is one data path 2310 to the external memory device. Data path 2310 is M bits, where M is typically 8, 16, 32, or 64 bits. The video access terminals are V bits where V is typically 8 bits. The CPU access terminal 2340 is D bits where D is an integer between eight and sixty four. Image data is retrieved from and stored in memory 550a as data bursts of B memory words having a width of M bits. Each access terminal 2310, 2320, and 2340 may be active at substantially the same time. As described above, the image data RD_OUT, shown in FIG. 9, provided from frame store controller 605 and image data WR_IN, shown in FIG. 9, provided to frame store controller 605 are regular signals having fixed blanking times as determined by signals RD_HA, RD_VA, WR_HA, and WR_VA shown in FIGS. 15 and 22.

The data provided to FIFOs 2345 and 2350 from memory 550a are provided in bursts of data. In other words, there is a block transfer of data from memory 550a to FIFO 2350 and FIFO 2345 to memory 550a. The data exchange between FIFOs 2345 and 2350 and memory 550a are provided in bursts of data. The data exchange between FIFOs 2345, 2350, and that respective access terminals 2320 and 2330 are provided as serial 8-bit words.

Data provided to and from CPU access terminal 2340 is a lower priority and tasks that need to be performed to control the memory 550a, such as memory refresh, are shared with use of the CPU access terminal 2340.

As is shown in FIG. 24, the frame store controller performs several operations during a frame store cycle. In the frame store access cycle there are three memory access cycles: video write cycle (VWC) of B words, video read cycle (VRC) of B words, and a CPU access cycle (CAC). The bandwidth of the image input and image output terminals is determined in accordance with equation (7) below. The data value VB is the bandwidth of the terminals 2320 and 2330.

$$VB = \frac{M}{V} \cdot \frac{B}{FSC} \text{ where } FSC = VWC + VRC + CAC \quad (7)$$

Write FIFO 2345 and read FIFO 2350 accommodate the data to be provided to and from memories 550a and 550b. Accordingly, the terminals 2320 and 2330 are regular and are not interrupted. The retrieval and storage of image data is controlled using video read control 2380 and video write control 2375, respectively. Video read control 2380 and video write control 2375 control the image data retrieval and storage operations as described above with reference to FIGS. 10 through 22.

An access to CPU access terminal occurs if there is a request from processor 540, shown in FIG. 5. The access to CPU access terminal is not initiated if the CPU access cycle CAC is being used by another function, such as a DRAM refresh cycle. If the width D of the CPU data bus 2355 is equal to or less than the width M of the memory data bus, then the CPU access latency will be more than CAC, less than (2*FSC+CAC) when a refresh cycle needs to be provided, and is typically slightly longer than FSC/2+CAC provided that refresh cycles are infrequent. If width D is larger than width M, the CPU access latency is increased by a value of IL determined in accordance with equation (9) below.

$$IL = FSC * \left(\frac{D}{M} - 1\right) \quad (9)$$

Since the typical CPU access latency may be a long period of time, the CPU cache memory including write cache memory 2360 and read cache memory 2365, is included within the circuitry of the frame store controller 605. Write cache memory 2360 and read cache memory 2365 may be combined as a single memory.

The write cache memory 2360 stores image data from processor 540, shown in FIG. 5. During the CPU access cycle CAC, frame store controller 605 stores image data in the write cache memory 2360. The entire contents of the write cache memory 2360 may not be stored during the CPU access cycle CAC when the write cache memory 2360 includes more than M bits. During the CPU access cycle CAC, a burst of image data may be retrieved from or stored in memory 550a.

When processor 540, shown in FIG. 5, initiates a image data retrieval operation, the image data to be retrieved is stored in read cache memory 2365, the image data stored in read cache memory 2365 is provided directly to processor 540 via CPU access terminal 2340. Otherwise, the appropriate image data from memory 550a is retrieved during the next CPU access cycle. Then, the retrieved data is provided from read cache 2365 to processor 540. Image data can be retrieved from the memory 550a and stored in read cache 2365 in anticipation of image data requests from processor 540. For example, if the processor has retrieved image data from memory 550a during a previous CPU access cycle CAC, the next sequential image data in memory 550a may be retrieved and stored in read cache 2365 during the next or subsequent CPU access cycles CAC. In this way, if processor 540 is retrieving image data sequentially, the next sequential image data requested by processor 540 will already be stored in read cache 2365. Thus, CPU access latency is minimized.

If image data in the write cache memory 2360 includes image data which updates image data to be retrieved by or which is already stored in read cache memory 2365, cache control 2370 controls the update of image data stored in the read cache memory 2365. For example, if the read cache memory 2365 contains image data that is being updated during a write cycle from processor 540 or by image data provided in input image signal WR_IN to terminal 2320, then the image data in read cache memory 2365 could be marked as "old" by the cache control 2370. Cache control 2370 requests updated image data be retrieved from memory 550a and stored in read cache 2365 during the next CPU access cycle CAC.

Memories 550a and 550b may be, for example, synchronous DRAM (SDRAM). In a SDRAM memory, the memory is divided into two memory banks. An access to one of the banks is typically in the form of a burst of data of, for example, up to eight data items. While one bank of data is being accessed, the access to the other banks may be initiated. Thus, a long burst access to the memory is provided. The data stored in the SDRAM is stored in eight data blocks in an interleaved fashion between the two memory banks. The data accesses are synchronous clocked and provide a high data burst access of 100 MHz (10 ns access cycle).

Each burst of image data requires a setup time. The overhead for a burst read cycle is about eight clock cycles of 10 ns. The write overhead is about five clock cycles of 10 ns. By increasing the burst size (BS), the overhead becomes relatively insignificant. In this case the size of the write FIFO 2345 and the read FIFO 2330 is increased to accommodate the increased amount of image data provided from memory 550a during a burst.

Also, if the burst length is large, a small size image will have significant overhead. For example, if the burst length is 128 pixel values, yet the image data size that is being retrieved or stored is 16 pixel values, the effective access rate is approximately 16/128 that of a standard video rate. Thus, the burst length is chosen depending upon the particular application.

If the width of memory 550a is M bits and M is a multiple of the width V of access terminals 2320 and 2330, the effective video I/O rate of the frame store controller 605 may be increased. When the width of memory 550a is M and is a multiple of the width V of access terminals 2320 and 2330, write FIFO 2345 and read FIFO are as wide as the memory bus 2310, and bus width converters need to be added at the input of the write FIFO and at the output of the read FIFO.

Tables 3–5 provide the image retrieval and storage rates as a function of the width M of memory 550a and the width V of the access terminals 2320 and 2330. Table 3 illustrates the total number of 10 ns clock cycles required for each video write cycle VWC of B words, video read cycle VRC of B words, and a CPU access cycle CAC.

TABLE 3

| Burst size: | 8 | 16 | 32 | 64 | 128 | 256 |
|---|---|---|---|---|---|---|
| Video Read cycles | 16 | 24 | 40 | 72 | 136 | 264 |
| Video write cycles | 13 | 21 | 37 | 69 | 133 | 261 |
| CPU access cycles | 16 | 24 | 40 | 72 | 136 | 264 |

Table 4 provides the estimated video I/O rate as a function of burst size and width of the memory. Table 4 assumes that each of the accesses: the video write cycle VWC, video read cycle VRC, and CPU access cycle CAC, are equal size data bursts. The number of cycles in Table 4 are shown as a function of the width M of the data bus 2310, shown in FIG. 23, between memory 550a and the interface circuitry.

TABLE 4

| Burst size: | 8 | 16 | 32 | 64 | 128 | 256 |
|---|---|---|---|---|---|---|
| Total cycles: | 45 | 69 | 117 | 213 | 405 | 789 |
| M = 8 | 18 | 23 | 27 | 30 | 32 | 32 |
| M = 16 | 36 | 46 | 55 | 60 | 63 | 65 |
| M = 32 | 71 | 93 | 109 | 120 | 126 | 130 |

Table 5 is the estimated video I/O rate as a function of burst size and memory data width. In Table 5 is assumed that video write cycle VWC and the video read cycle VRC use equal size data bursts, but the CPU access cycle CAC uses eight pixel value bursts. The number of cycles in Table 5 are shown as a function of the width M of the data bus 2310, shown in FIG. 23, between memory 550a and the interface circuitry.

TABLE 5

| Burst size: | 8 | 16 | 32 | 64 | 128 | 256 |
|---|---|---|---|---|---|---|
| Total cycles: | 45 | 61 | 93 | 157 | 285 | 541 |
| M = 8 | 18 | 26 | 34 | 41 | 45 | 47 |
| M = 16 | 36 | 52 | 69 | 82 | 90 | 95 |
| M = 32 | 71 | 105 | 138 | 163 | 180 | 189 |

Tables 4 and 5 demonstrate that if a 50 MHz clock rate is used by the PPP 560, shown in FIG. 6, M should be sixteen and B should be sixteen or thirty two depending on the access speed and latency requirements of the CPU access cycle CAC. Tables 4 and 5 also indicate that if a 100 MHz clock rate is desired, M should be thirty two.

Alternately, memory 550a may be a Rambus™ DRAM (RDRAM) which is a DRAM memory with a special memory interface that allows the transfer of data bursts at up to 500 MHz. The Rambus™ based memory devices have an eight bit data transfer bus, and use the same bus for addressing. Internally to the memory device there are two memory banks, each with a cache to provide quick access response to requests for data transfers. If the data requested from the memory device is in the memory device cache, the overhead to start a burst transfer is 40 ns. If the data is not in cache, then the overhead is in the range of 84 to 156 ns. Table 6 summarizes the effect of the overhead as a function of burst data length for a single port access cycle. Rambus supports data bursts of 8 to 256 data pixels values.

TABLE 6

| Burst length: | setup: | 8 | 16 | 32 | 64 | 128 | 256 |
|---|---|---|---|---|---|---|---|
| cache hit | 40 ns | 7.0 | 4.5 | 3.3 | 2.6 | 2.3 | 2.2 |
| no cache hit min | 84 ns | 12.5 | 7.3 | 4.6 | 3.3 | 2.7 | 2.3 |
| no cash hit max | 156 ns | 21.5 | 11.8 | 6.9 | 4.4 | 3.2 | 2.6 |

Table 7 below demonstrates the effective data transfer rate possible for single port access as a function of the burst length. In Table 7, for example, if the data to be retrieved is in cache and the burst length is 16, the transfer rate of data from memory 550a to the frame store controller is 222 MHz.

TABLE 7

| Burst length: | | 8 | 16 | 32 | 64 | 128 | 256 |
|---|---|---|---|---|---|---|---|
| cache hit | (MHz) | 143 | 222 | 308 | 381 | 432 | 464 |
| no cash hit min | (MHz) | 80 | 138 | 216 | 302 | 376 | 430 |
| no cash hit max | (MHz) | 47 | 85 | 145 | 225 | 311 | 383 |

Table 8 below demonstrates the effective transfer rate possible for dual port access: one write cycle VWC and one video read cycle VRC, for triple port access: one write cycle VWC, one read cycle VRC, and CPU access cycle CAC, and five port access: two write cycles VWC, two read cycles VRC, and CPU access cycle CAC. The estimated transfer rates assume that the write cycles VWC do not have a memory size problem and the read cycles VRC and the CPU access cycle CAC have either a minimum or a maximum cache access overhead.

TABLE 8

| Burst length: | | 8 | 16 | 32 | 64 | 128 | 256 |
|---|---|---|---|---|---|---|---|
| Dual Port min | MHz | 51 | 85 | 127 | 168 | 201 | 223 |
| Dual Port max | MHz | 35 | 62 | 99 | 142 | 181 | 210 |
| Triple port min | MHz | 31 | 53 | 80 | 108 | 131 | 147 |
| Triple port max | MHz | 20 | 36 | 59 | 87 | 114 | 136 |
| Five port min | MHz | 19 | 33 | 49 | 66 | 79 | 89 |
| Five port max | MHz | 14 | 25 | 42 | 63 | 84 | 100 |

Table 8 demonstrates that with triple port access and a 50 MHz access rate, the burst length should be 32 pixel values. For a 100 MHz access rate the burst length should be 128 pixel values. If the CPU access is given lower priority it is possible to reduce the burst lengths. The burst lengths are fully programmable via processor 540, shown in FIG. 5.

If a large memory bandwidth is desired, another write access terminal 2320 shown in FIG. 23, and another read access terminal 2330, shown in FIG. 23, may be added to the frame store controller. This would create a five access terminal frame store which would be functionally equivalent to two separate frame store controllers. For example, a system with 50 MHz video clock rates, using burst lengths of 64 pixels or 32 pixels if CPU access is given lower priority, may be implemented using a frame store controller 605 having five terminal access.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. An image processing apparatus comprising:

a single memory;

an integrated circuit connected to the single memory, the integrated circuit including processing means for processing a plurality of image signals, means for filtering at least one of the plurality of image signals, and a five port frame store controller having means for concurrently storing at least two image signals in the memory, and means for concurrently reading at least two image signals from the memory, and a crosspoint switch for concurrently routing at least two image signals to the filtering means, the storing means, the reading means, and the processing means.

2. The apparatus according to claim 1 wherein each image signal includes a timing signal to indicate valid data, the timing signal processed by the processing means, storing means, reading means and routing means.

3. The apparatus according to claim 1 wherein filter means is a two dimensional filter.

4. The apparatus according to claim 1 wherein the filter means is a separable filter.

5. The apparatus according to claim 1 wherein the integrated circuit further comprises means for receiving a program signal to configure the filtering means, the storing means, the reading means, and the processing means to perform a series of predefined operations to produce an output signal.

6. The apparatus according to claim 1 wherein the processing means is a lookup table.

7. The apparatus according to claim 2 wherein the timing signal includes a horizontal blanking period, and the processing means includes means for delaying the horizontal blanking period until the storing means is ready to store the image signal to the memory.

8. An image processing apparatus comprising:

a single memory;

an integrated circuit connected to the single memory, the integrated circuit including processing means for processing a plurality of image signals, means for filtering at least one of the plurality of image signals, a five port frame store controller having (a) means for concurrently storing at least two image signals in the memory, and (b) means for concurrently reading at least two image signals from the memory;

a crosspoint switch for concurrently routing at least two image signals to the filtering means, the storing means, the reading means, and the processing means.

9. An image stabilization apparatus comprising:

a single memory;

an integrated circuit connected to the single memory, the integrated circuit including:

means for receiving an image signal including a first frame and a second frame;

means for generating further image signals including a first Laplacian pyramid signal from the first frame and a second Laplacian pyramid signal from the second frame;

a five port frame store controller having means for concurrently storing at least two of said image signal and said further image signals in the memory; and means for concurrently reading at least two of said image signal and said further image signals from the memory; and a crosspoint switch for concurrently routing at least two of said image signals to the filter means, the storing means, the reading means and the processing means;

means for producing alignment values between the first Laplacian pyramid signal and the second Laplacian pyramid signal; and means for warping one of the first and second frames using the alignment values.

* * * * *